(12) United States Patent
Anderson, Jr. et al.

(10) Patent No.: US 9,551,153 B2
(45) Date of Patent: Jan. 24, 2017

(54) SCUPPER DOOR SYSTEMS

(71) Applicant: Smart Vent Products, Inc., Pitman, NJ (US)

(72) Inventors: Winfield Scott Anderson, Jr., Palm Beach Gardens, FL (US); Tom Little, Pitman, NJ (US); James Rycek, Pitman, NJ (US); Michael J. Graham, Pitman, NJ (US)

(73) Assignee: Smart Vent Products, Inc., Pitman, NJ (US)

( * ) Notice: Subject to any disclaimer, the term of this patent is extended or adjusted under 35 U.S.C. 154(b) by 0 days.

(21) Appl. No.: 14/681,227

(22) Filed: Apr. 8, 2015

(65) Prior Publication Data

US 2016/0298335 A1    Oct. 13, 2016

(51) Int. Cl.
*E02B 3/12* (2006.01)
*E02B 3/06* (2006.01)
(Continued)

(52) U.S. Cl.
CPC ....... *E04D 13/0409* (2013.01); *E04D 13/0445* (2013.01); *E04D 13/0481* (2013.01); *E05F 15/49* (2015.01); *E05F 15/50* (2015.01); *E05F 15/71* (2015.01); *E02B 3/12* (2013.01); *E02B 7/40* (2013.01); *E02B 7/50* (2013.01); *E04D 2013/0422* (2013.01); *E04D 2013/0427* (2013.01)

(58) Field of Classification Search
CPC ............... E02B 7/40; E02B 7/50; E02B 7/20; E02B 7/22; E02B 7/36; E02B 7/26; E02B 3/12; E02B 3/04; E02B 3/06; E04B 1/7076; E04H 1/1238; E04D 13/0409; E04D 13/0445; E04D 13/0481; E04D 2013/0422; E04D 2013/0427; E05F 15/49; E05F 15/50; E05F 15/71
USPC .................................. 52/302.1, 302.2, 302.7
See application file for complete search history.

(56) References Cited

U.S. PATENT DOCUMENTS

| 73,159 A | 1/1868 | Besse |
| 100,623 A | 3/1870 | Hays |

(Continued)

FOREIGN PATENT DOCUMENTS

| EP | 2662513 | 11/2013 |
| EP | 2682687 | 1/2014 |

(Continued)

OTHER PUBLICATIONS

Smart Vent, web pages from www.smartvent.com, printed Apr. 6, 2015.

(Continued)

*Primary Examiner* — Phi A
(74) *Attorney, Agent, or Firm* — Akerman LLP

(57) ABSTRACT

A scupper door system includes a frame defining a passageway. A door is mounted within the frame at a pivot and is therein rotatable about the pivot within the passageway between a closed position, blocking the passageway, and an open position wherein the passageway is open to permit passage of water therethrough. A latch mechanism is configured to retain the door in the closed position and is triggerable in response to a preset water condition at one side of the passage to release the door from the closed position and allow the door to rotate to the open position.

18 Claims, 16 Drawing Sheets

(51) Int. Cl.
*E04D 13/04* (2006.01)
*E05F 15/71* (2015.01)
*E05F 15/49* (2015.01)
*E05F 15/50* (2015.01)
*E02B 7/40* (2006.01)
*E02B 7/50* (2006.01)

(56) References Cited

U.S. PATENT DOCUMENTS

| | | |
|---|---|---|
| 314,865 A | 3/1885 | Monger |
| 735,053 A | 8/1903 | Bates |
| 850,441 A | 4/1907 | McGinnis |
| 911,290 A | 2/1909 | Burkett |
| 1,089,232 A | 3/1914 | Larson |
| 2,105,735 A | 1/1938 | Hodge |
| 2,118,535 A | 5/1938 | Betts |
| 2,565,122 A | 8/1951 | Cowan |
| 2,611,310 A | 9/1952 | Cowan |
| 2,774,116 A | 12/1956 | Wolverton |
| 2,798,422 A | 7/1957 | Bourque |
| 3,123,867 A | 3/1964 | Combs |
| 3,425,175 A | 2/1969 | Gerde |
| 3,680,329 A | 8/1972 | Burtis |
| 3,683,630 A | 8/1972 | Alexandre |
| 3,927,709 A | 12/1975 | Anderson et al. |
| 3,939,863 A | 2/1976 | Robison |
| 3,942,328 A | 3/1976 | Bunger |
| 3,974,654 A | 8/1976 | Mirto et al. |
| 3,978,616 A | 9/1976 | Pennock |
| 4,048,771 A | 9/1977 | Thistlethwaite |
| 4,116,213 A | 9/1978 | Kamezaki |
| 4,146,346 A | 3/1979 | Salo |
| 4,174,913 A | 11/1979 | Schliesser |
| 4,227,266 A | 10/1980 | Russell |
| 4,231,412 A | 11/1980 | Nowak |
| 4,290,635 A | 9/1981 | McKenzie |
| 4,349,296 A | 9/1982 | Langeman |
| 4,378,043 A | 3/1983 | Sorenson |
| 4,549,837 A | 10/1985 | Herbert |
| 4,576,512 A | 3/1986 | Combes et al. |
| 4,606,672 A | 8/1986 | LeSire |
| 4,669,371 A | 6/1987 | Sarazen, Jr. et al. |
| 4,676,145 A | 6/1987 | Allred |
| 4,699,045 A | 10/1987 | Hensley |
| 4,754,696 A | 7/1988 | Sarazen et al. |
| 5,171,102 A * | 12/1992 | De Wit ............ E02B 7/54 405/100 |
| 5,253,804 A | 10/1993 | Sarazen et al. |
| 5,293,920 A | 3/1994 | Vagedes |
| 5,294,049 A | 3/1994 | Trunkle et al. |
| 5,330,386 A | 7/1994 | Calandra |
| 5,408,789 A | 4/1995 | Pfleger |
| 5,460,572 A | 10/1995 | Waltz et al. |
| 5,487,701 A | 1/1996 | Schedegger et al. |
| 5,904,199 A | 5/1999 | Messner |
| 5,944,445 A * | 8/1999 | Montgomery ........ E04B 1/7076 405/87 |
| 5,994,445 A | 11/1999 | Kaschel et al. |
| 6,092,580 A | 7/2000 | Lucas |
| 6,287,050 B1 | 9/2001 | Montgomery et al. |
| 6,485,231 B2 | 11/2002 | Montgomery et al. |
| 6,779,947 B1 * | 8/2004 | Buchanan ............ E02B 7/40 405/100 |
| 7,730,679 B2 * | 6/2010 | Eckenswiller ........ E06B 7/14 137/527.8 |
| 8,375,664 B2 * | 2/2013 | Gower, Sr. ........... E04B 1/7076 52/169.5 |
| 8,464,474 B2 * | 6/2013 | Johnson ............ E04D 13/064 52/11 |
| 8,584,411 B2 * | 11/2013 | Mitchell ............ E06B 7/14 52/209 |
| 2002/0021941 A1 * | 2/2002 | Montgomery ........ E02B 7/40 405/100 |
| 2003/0082008 A1 * | 5/2003 | Sprengle, Sr. ........ E02B 7/40 405/87 |
| 2010/0325985 A1 * | 12/2010 | Tan .................. E04H 1/1238 52/220.8 |
| 2011/0185657 A1 * | 8/2011 | Delaquis ............ E06B 1/70 52/236.3 |
| 2011/0219714 A1 * | 9/2011 | Martin ............... E04B 1/7092 52/302.1 |
| 2012/0260593 A1 * | 10/2012 | Gower, Sr. ........ E04B 1/7076 52/302.1 |
| 2014/0109993 A1 | 4/2014 | Kelly |

FOREIGN PATENT DOCUMENTS

| | | |
|---|---|---|
| EP | 2764192 | 8/2014 |
| GB | 2147933 | 5/1985 |
| JP | 55-085720 | 6/1980 |
| JP | 04-203112 | 7/1992 |

OTHER PUBLICATIONS

Smart Vent, product literature "Smart Vent Foundation Flood Vents vs. Flood Flaps" printed Apr. 6, 2015.
Smart Vent, product literature "Family of Products" printed Apr. 6, 2015.
FEMA, Openings in Foundation Walls and Walls of Enclosures, Technical Bulletin 1, Aug. 2008.
FEMA, Non-Residential Floodproofing, Technical Bulletin 3, Apr. 1993.
Smart Vent, "Foundation Flood Vents" printed Apr. 6, 2015.
Smart Vent, Product Catalog printed Apr. 6, 2015.

* cited by examiner

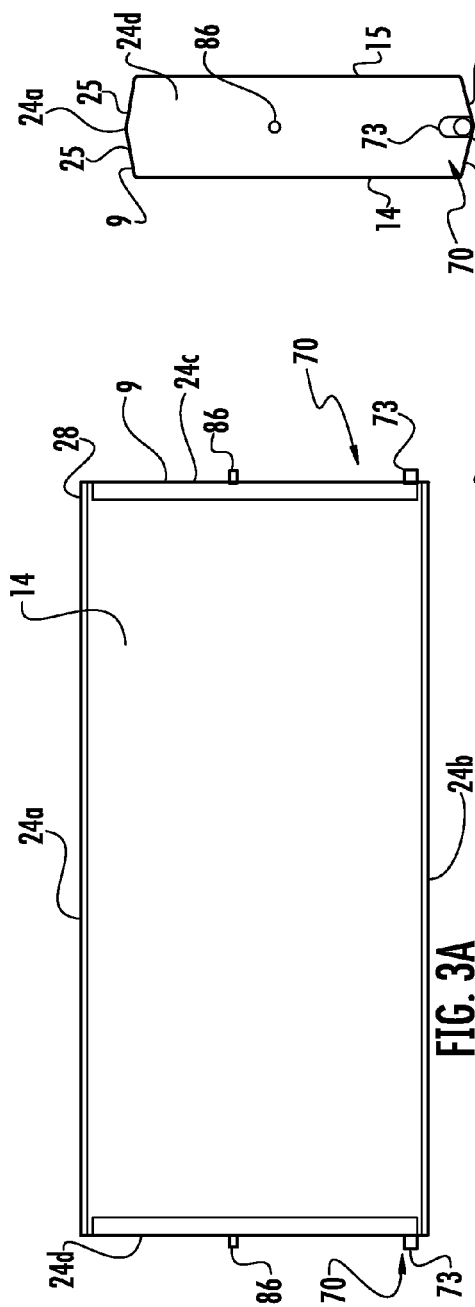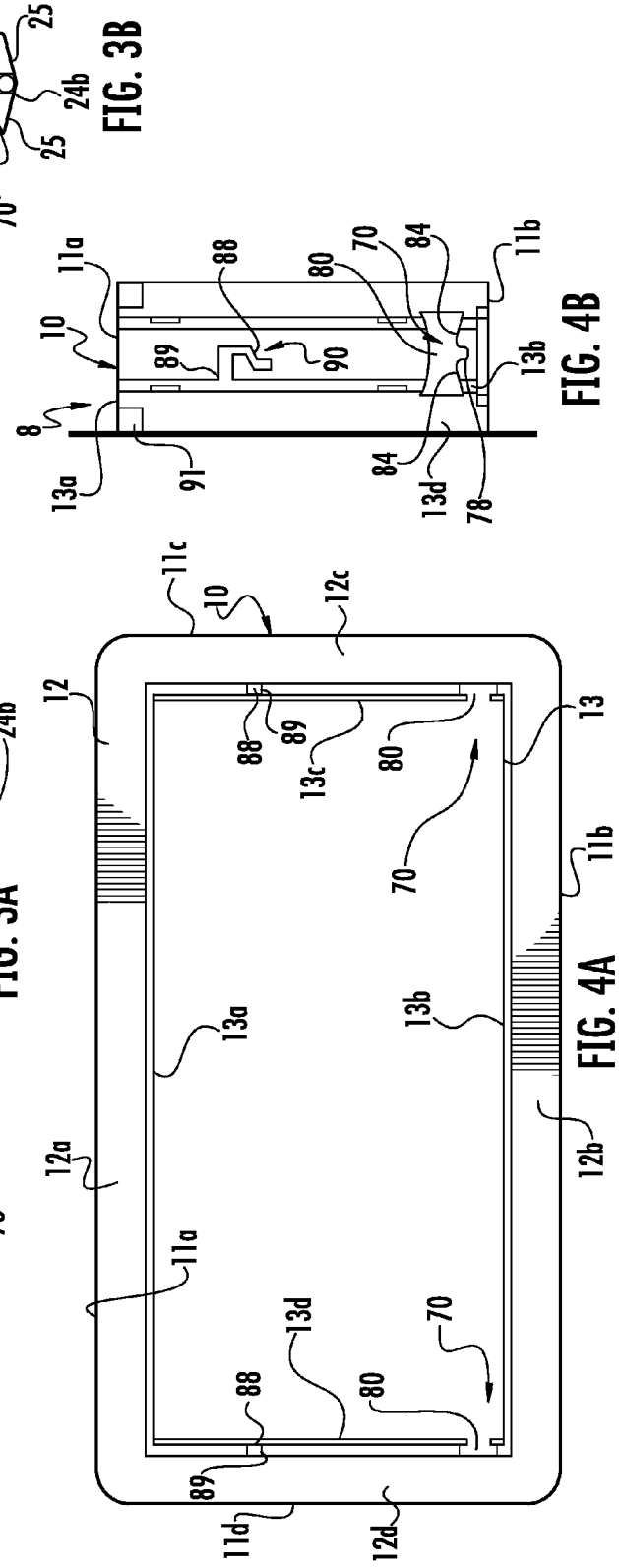

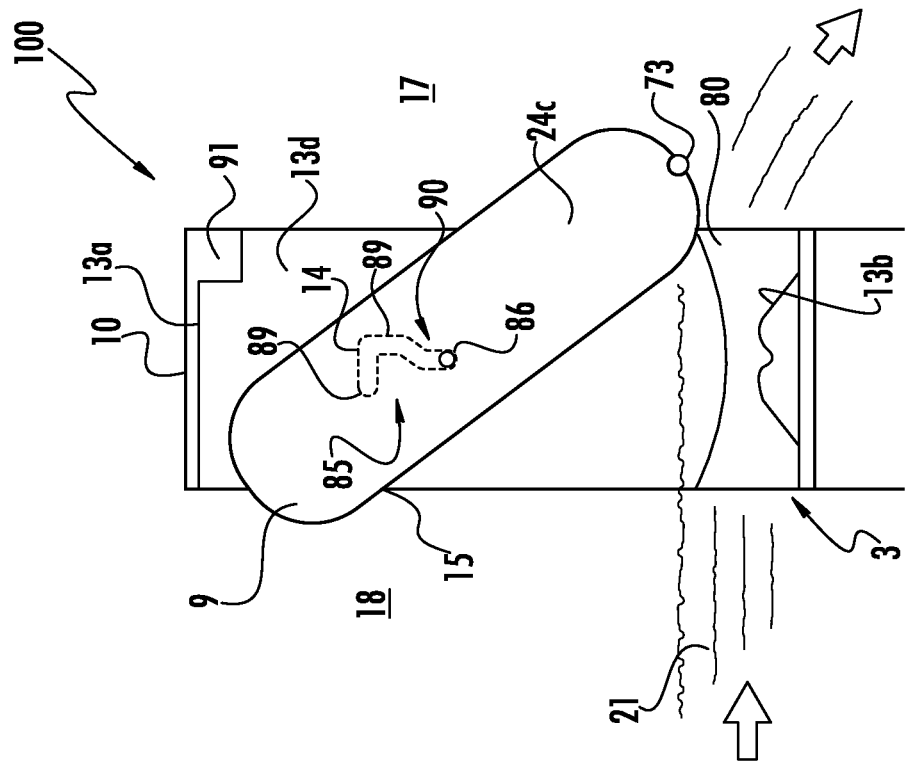
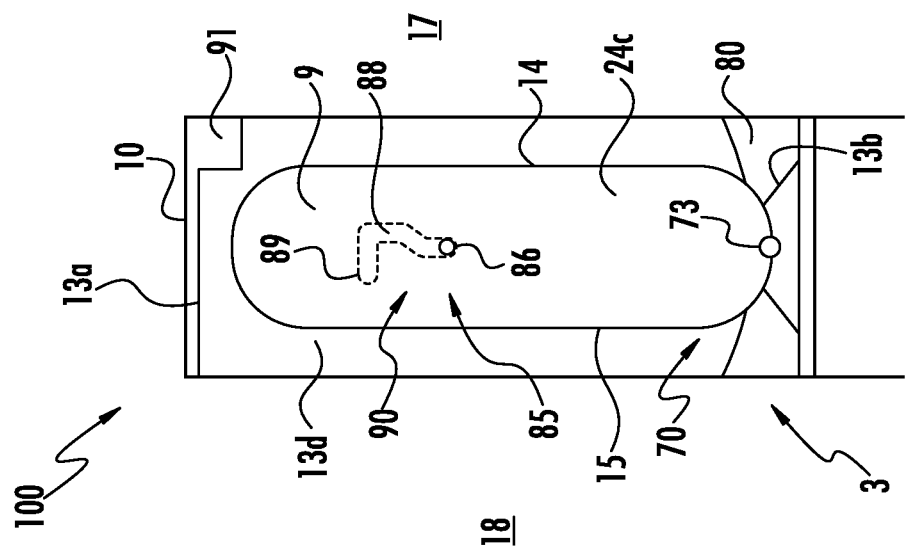
FIG. 5B
FIG. 5A

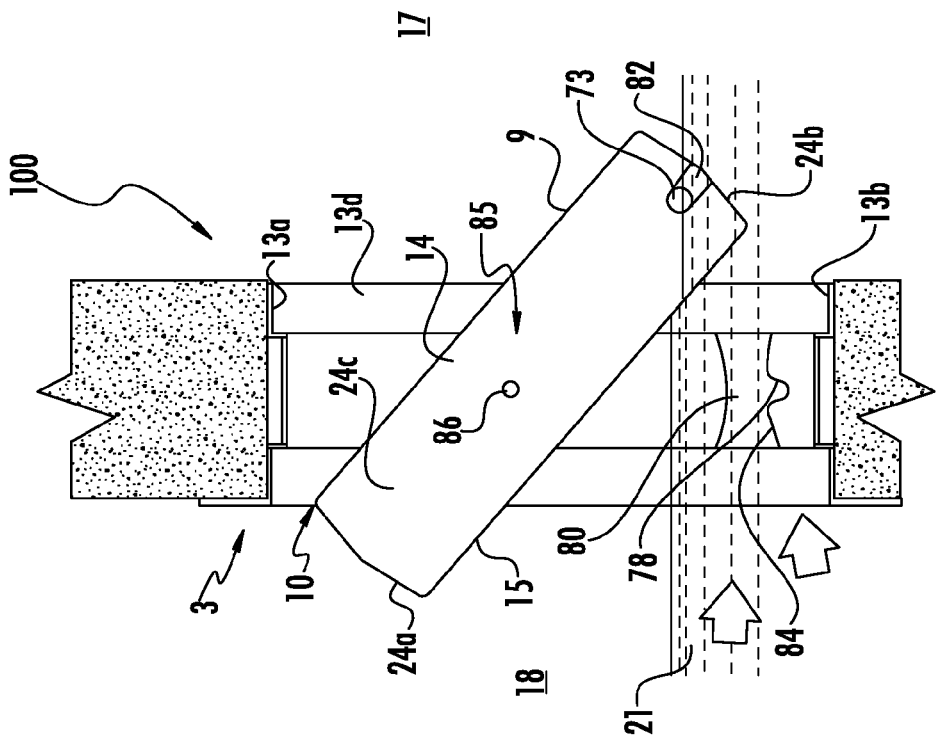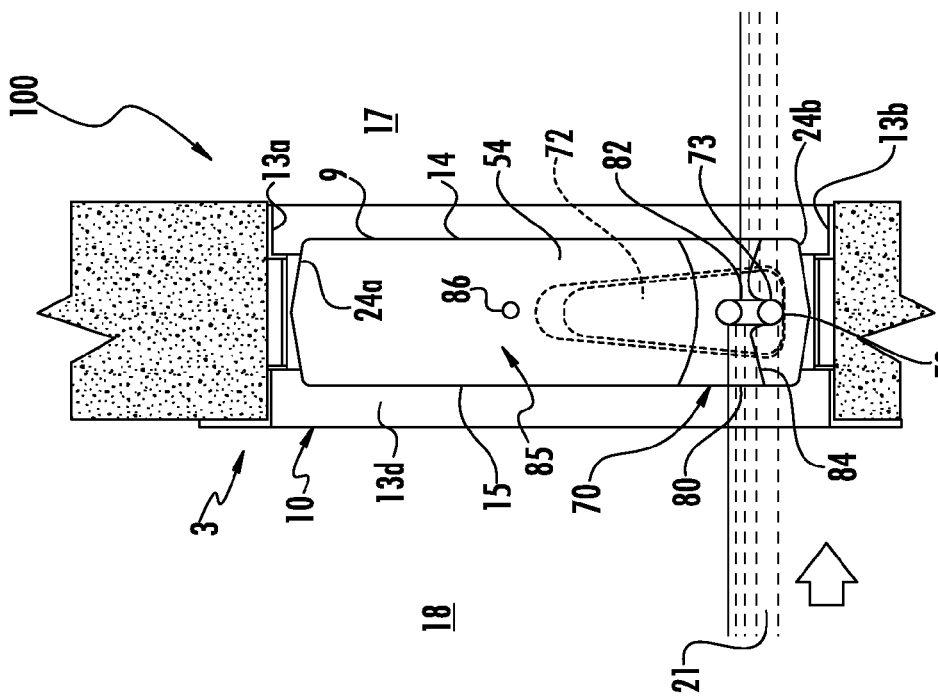

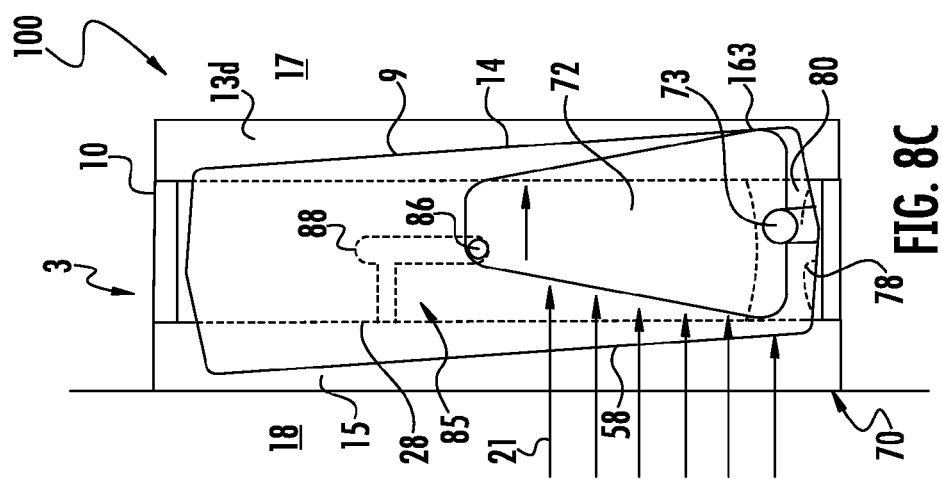
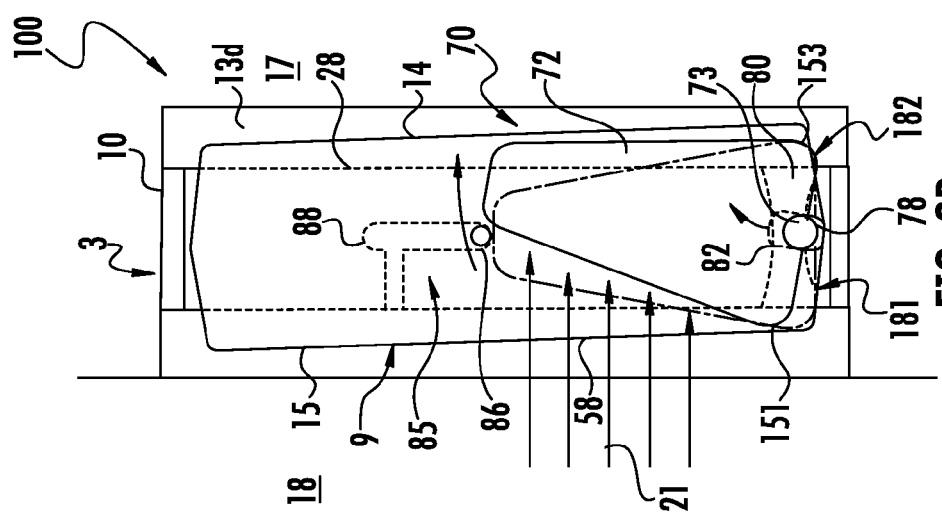
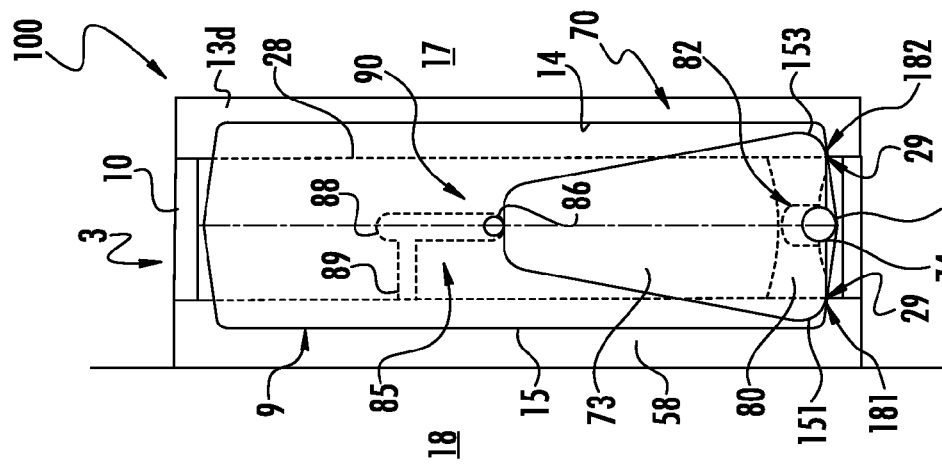

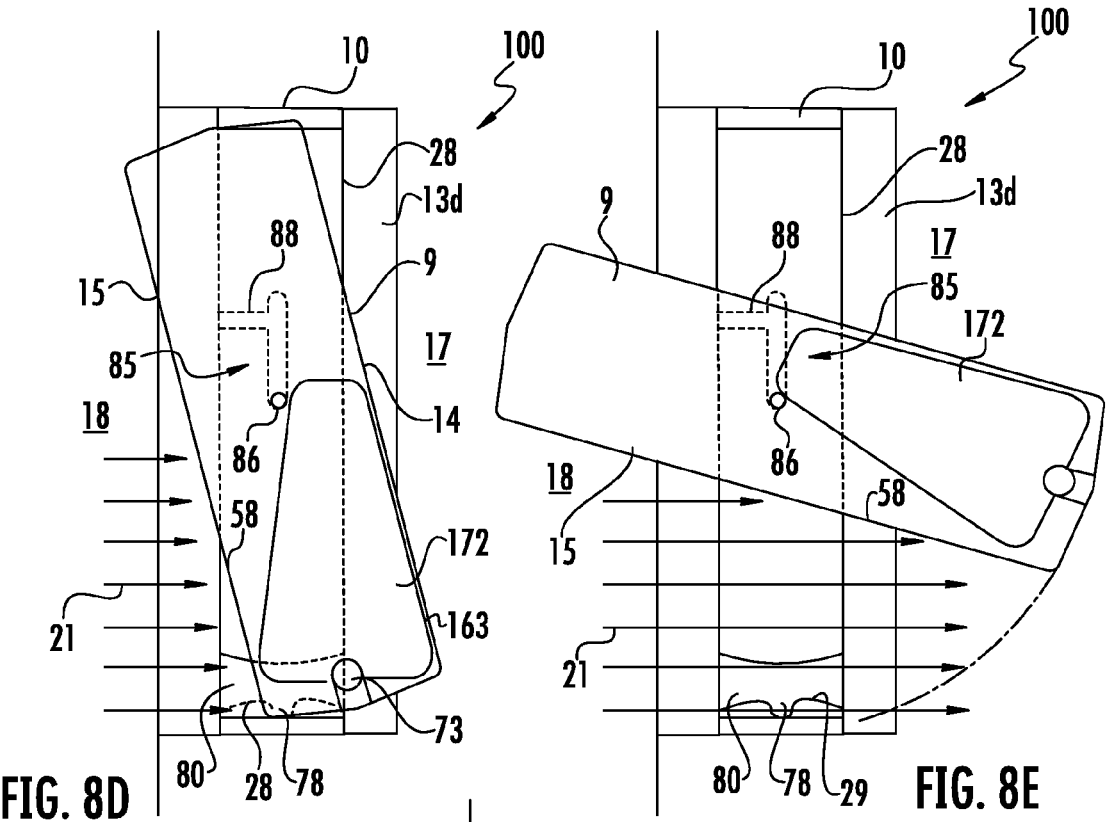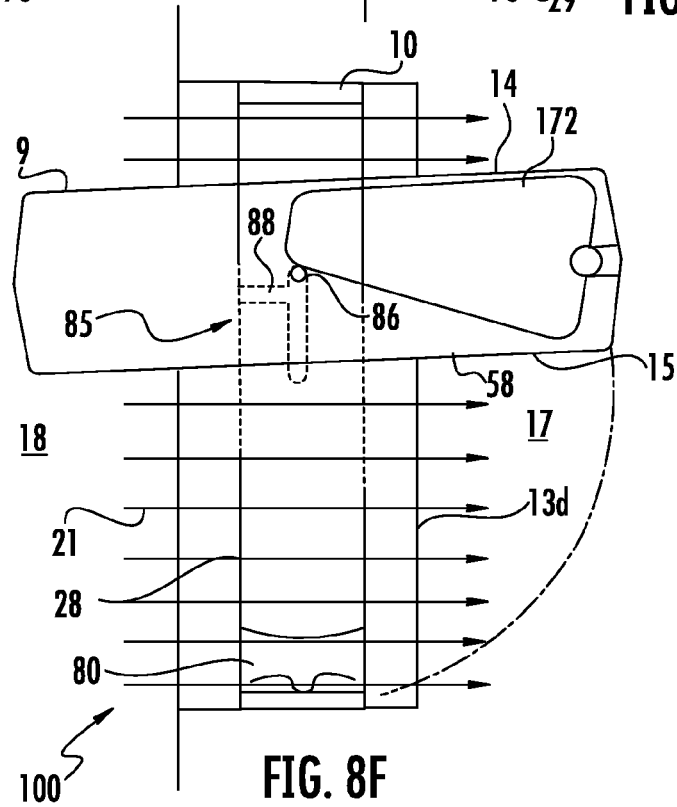

SCUPPER DOOR SYSTEMS

TECHNICAL FIELD

The present disclosure is directed to scupper passageways, and more specifically to doors for scupper passageways.

BACKGROUND

Water collected on surfaces such as decks, roofs, and terraces may be drained to prevent potentially damaging accumulations. A prior art drainage system is provided as an example in FIGS. 1A and 1B. The drainage system includes a roof 1 and a parapet 2 positioned around the perimeter of the roof 1. Scupper passageways extend through the parapet 2 and include primary scuppers 5 and secondary scuppers 7. When water collects at the roof surface 4, the water initially flows to the primary scuppers 5 positioned approximately level with or below the roof surface 4. Downspouts 6 are positioned to receive water from the primary scuppers 5 for additional directing of the water. The secondary scuppers 7 are positioned above the adjacent roof surface 4 at a height that may be defined by code or preferred engineering standards. The secondary scuppers 7 function to provide additional drainage points for accumulating water 21 as shown in FIG. 1B if the primary scuppers 5 or downspouts 6 become clogged or lack desired drainage capacity.

SUMMARY

In one aspect, a scupper door system comprises a scupper frame defining a passageway between a first side and a second side. A door may be mounted within the frame at a pivot and be therein rotatable about the pivot within the passageway between a closed position, blocking the passageway, and an open position wherein the passageway is open to permit passage of water therethrough. A latch mechanism may be configured to retain the door in the closed position and be further triggerable in response to a preset water condition at the first side to release the door from the closed position and allow the door to rotate to the open position.

The latch mechanism may comprise a retention pin and a retention slot, wherein the retention pin is positioned to be received within the retention slot to retain the door in the closed position. In the presence of the preset water condition, the retention pin is configured to be withdrawn from the retention slot to release the door. The preset water condition may comprise a minimum level of water at the first side. The pivot may comprise a pivot pin received within a pivot slot. The pivot slot may comprise a vertically extending portion wherein the pivot pin may translate to allow the door to vertically translate to a raised position. The door may be buoyant and configured to vertically translate to the raised position when the minimum level of water is present at the first side. Vertical translation of the door to the raised position in the presence of the minimum level of water may withdraw the retention pin from the retention slot. The door may be rotatable to the open position while in the raised position.

The latch mechanism may also comprise a float operatively coupled to one of the retention pin and retention slot. The float may be positioned to be raised by water present at the first side such that when the float is raised by the minimum level of water the retention pin is withdrawn from the retention slot. The float may be positioned within a chamber defined in the door. The chamber may include one or more ports to allow water present at the first side to enter the chamber and raise the float.

The latch mechanism may also comprise a blocker plate attached to the frame and a float associated with the door having a blocking surface. The float may be positioned such that blocking surface extends below a height of and contacts the blocker plate when the door is in the closed position to prevent the door from pivoting to the open position in the absence of the preset water condition. The preset water condition may comprises a minimum level of water at the first side. The float may be positioned to be floatable by the minimum level of water at the first side to relocate the blocking surface above the blocker plate to release the door. The door may define a chamber in which the float is positioned. The door may further define one or more fluid ports extending through a face of the door between the first side and the chamber.

The latch mechanism may also comprises a blocker plate attached to the frame and a fluid modifiable blocker positionable to contact the blocker plate to prevent the door from rotating from the closed position when so positioned. The fluid modifiable blocker may be positioned within a chamber accessible by water at the first side comprising the preset water condition. When the fluid modifiable blocker is accessed by the water at the first side comprising the preset water condition, the fluid modifiable blocker at least partially dissolves to release the door from the closed position. The preset water condition may comprise a minimum water level at the first side. A rain guard may be positioned to prevent falling rain from accessing the fluid modifiable material.

The passageway defined by the scupper frame may comprise a first passageway and a second passageway. The second passageway may be stacked above the first passageway. The door may comprise a first door and a second door, wherein the first door is positioned in the first passageway and the second door is positioned in the second passageway. In another embodiment, the door is positioned in the second passageway and the first passageway is open.

In another aspect, a method of draining a roof comprises locating a scupper frame within a parapet. The scupper frame defines a passageway between a first side and a second side of the parapet and a door is positioned within the passageway at a pivot and is rotatable between a closed position and an open position. The method may further comprise retaining the door in a closed position in the absence of a preset minimum level of water at the first side and opening the door to the open position in response to a pressure exerted by the preset minimum level of water present at the first side.

Retaining the door in the closed position may comprise extending a retention pin within a retention slot to retain the door in the closed position. Opening the door may comprise using the pressure exerted by the preset minimum level of water to withdraw the retention pin from the retention slot. Opening the door may further comprise allowing the pressure exerted by the preset minimum level of water to rotate the door to the open position after the retention pin is withdrawn from the retention slot.

BRIEF DESCRIPTION OF THE DRAWINGS

A more complete understanding of the present disclosure and its features and advantages will become apparent with reference made to the following description, taken in conjunction with the accompanying drawings, in which:

FIGS. 3A and 3B illustrate a scupper door according to various embodiments;

FIGS. 4A and 4B illustrate a scupper frame for fitting a scupper passageway with a scupper door according to various embodiments;

FIGS. 5A and 5B illustrate a scupper door system according to various embodiments;

FIGS. 6A and 6B illustrate a scupper door system according to various embodiments;

FIGS. 8A-8F illustrate a scupper door system according to various embodiments;

DESCRIPTION

Embodiments of the present disclosure may be best understood with reference to FIGS. 2-15 of the drawings, wherein like numerals are used for like or corresponding features of the various drawings and embodiments.

Figure 1A:
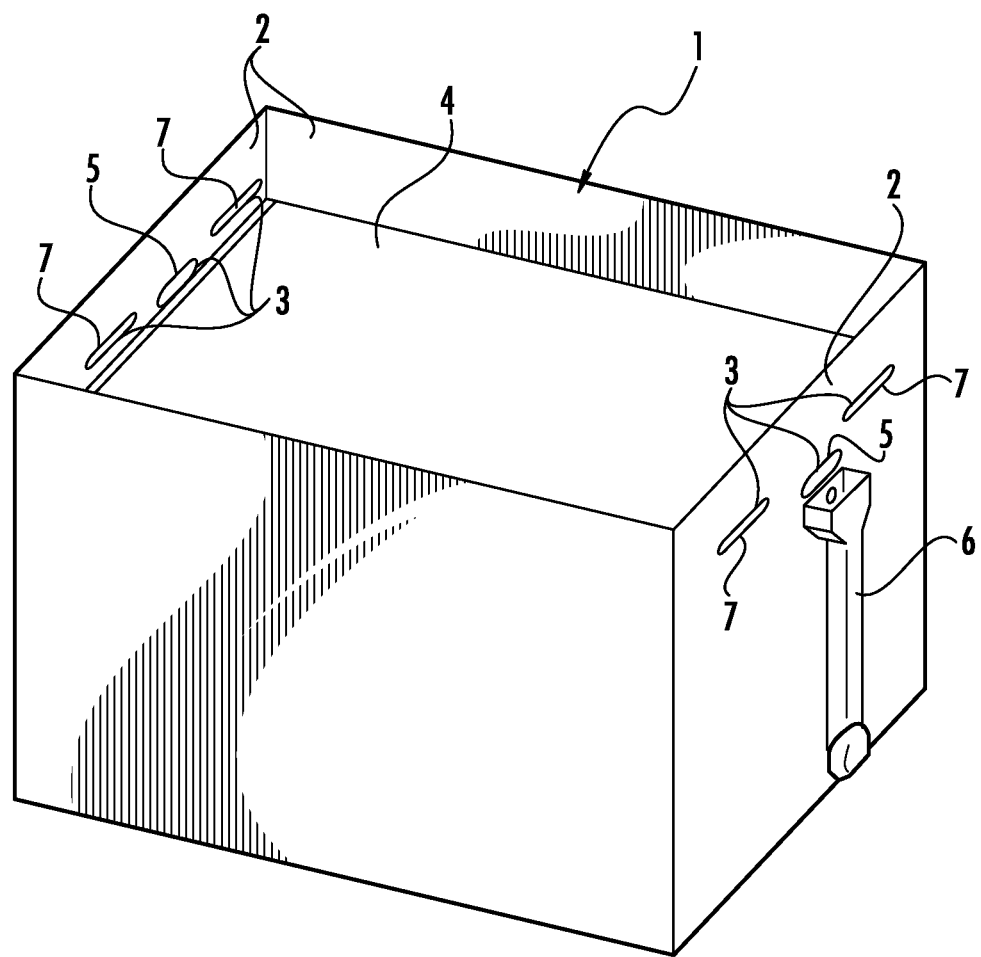
FIGS. 1A and 1B illustrate two views of a prior art unobstructed scupper passageways.
Figure 1B:
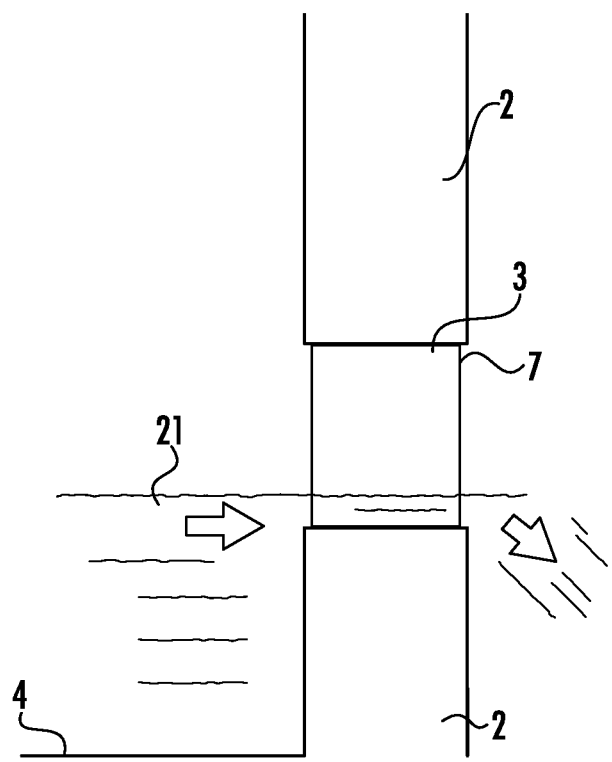

Traditional configurations of scupper passageways 3, whether primary 5 or secondary 7, as generally illustrated in FIGS. 1A and 1B, may detract from architectural aesthetics. As described herein, and generally illustrated in FIG. 2, scupper passageways 3 may be fitted with scupper doors 9 or scupper door systems 100. As will become more apparent in consideration of the below descriptions of the various embodiments, the herein disclosed scupper door system 100 may beneficially provide a more uniform look or added decorative architecture while retaining the drainage capabilities of the scupper passageway 3. The scupper door system 100 may also deter birds and other animals from nesting within or otherwise blocking the scupper passageway 3.

Figure 2:
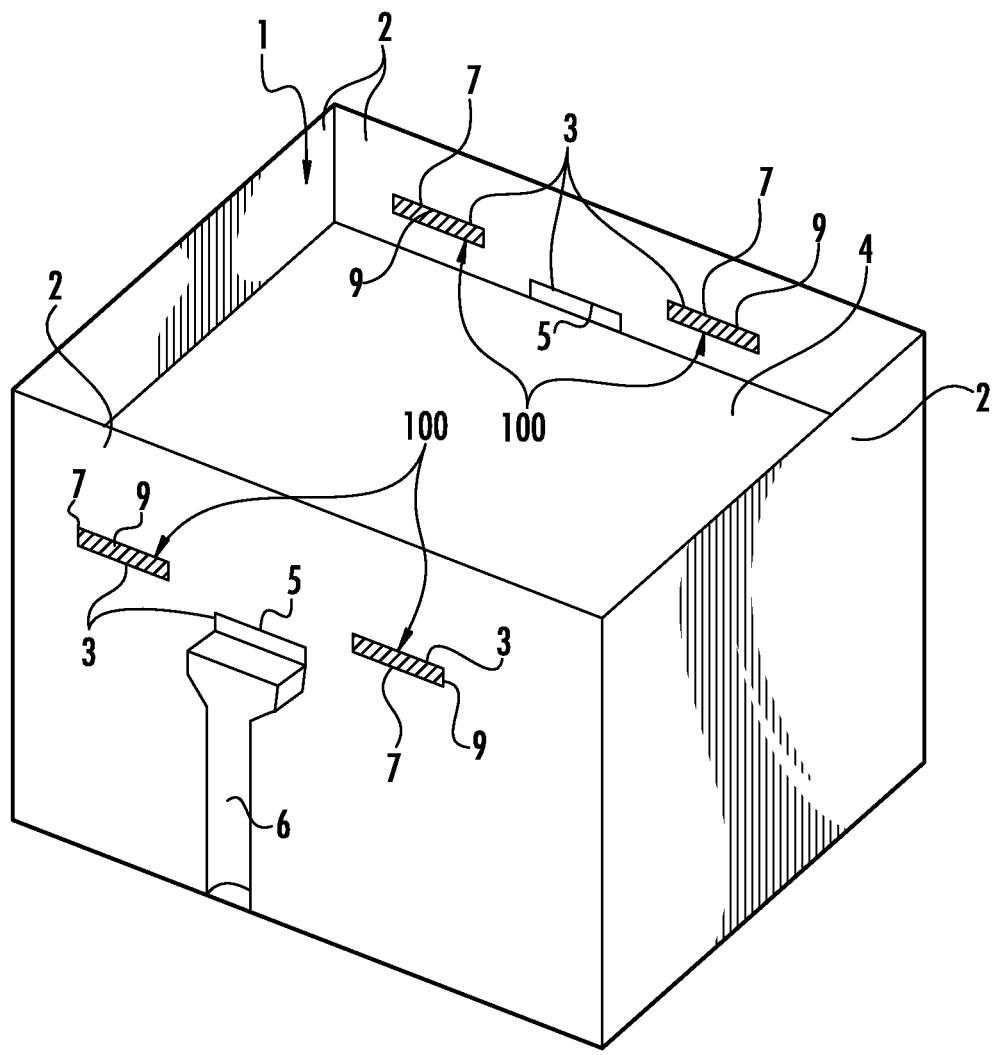
FIG. 2 illustrates a roof drainage system fitted with scupper passageways fitted with scupper door systems according to various embodiments.

As introduced above, FIG. 2 illustrates the drainage system of FIGS. 1A and 1B wherein the secondary scuppers 7 are fitted with scupper door systems 100 according to various embodiments. It is to be appreciated that scupper door system 100 may be configured for use with primary scuppers 5 or secondary scuppers 7, however, for ease of understanding, the scupper door system 100 will generally be described with respect to secondary scuppers 7. Furthermore, the scupper door system 100 may generally be described herein with respect to extending through a parapet 2 of a roof 1; however, it will be appreciated that similar scupper door systems 100 may find similar applicability for use to drain balconies, terraces, decks, or piers, for example.

Accordingly, the herein described scupper door system 100 may be useful for many types of scupper passageways 3 including installation within conventional scupper passageways, e.g., retrofitted or accessorized, that extend through parapets 2, bulwarks, or other barriers positioned around areas that may require draining.

In various embodiments, a scupper door system 100 comprises a scupper door 9 configured to remain closed unless triggered, e.g., caused or allowed, to open by a preset water condition associated with exteriorly directed or positioned water. Exteriorly directed or positioned water refers to accumulations of water positioned at or directed to the scupper system 100 for drainage away from the surface to be drained. For example, in the context of a scupper system 100 used for roof drainage as illustrated in FIG. 2, when the door is opened, exteriorly directed or positioned water flows from the roof side through the scupper passageway 3 for drainage at the drainage side of the scupper passageway 3, which will typically be motivated by gravity to drain from the roof surface 4. In various embodiments, the scupper door system 100 may be configured such that the scupper door 9 may pivot exteriorly or in the direction of the drainage side to open the passageway but remain closed to interiorly directed forces, such as those produced from wind. Accordingly, the scupper door system 100 may function as a selective or conditional scupper passageway determined by the presence of a preset water condition at the roof side. Interiorly directed may refer to directions other than exteriorly such as toward or into the scupper passageway 3 from the drainage side. It is to be appreciated that roof side and drainage side refer to the side that receives water flow from the roof surface 4 and the side that drains the water, respectively, and may not necessarily refer to the side most proximate to the roof 1. In one example, the door 9 may be configured to slide vertically or horizontally to an open position in response to exteriorly directed or positioned water. In another example, the door 9 may be configured to further pivot interiorly or toward the roof side in response to exteriorly directed or positioned water. The door 9 may also be configured to remain closed despite the occurrence of certain exteriorly directed forces, such as those produced by wind. However, in at least one embodiment, the door 9 may be freely pivotable in at least one of interiorly or exteriorly. With reference to direction the door 9 pivots used herein, unless stated otherwise, the direction referenced is with respect to the bottom edge of the door 9.

FIGS. 3A and 3B illustrate a face view and a side view, respectively, of an embodiment of a scupper door 9 for use with various embodiments of the scupper door system 100 (see, e.g., FIG. 2). The door 9 includes a door frame 28 having an outer perimeter defined by edges 24 that include a top edge 24a, a bottom edge 24b, and two side edges 24c and 24d. The edges 24 of the door 9 or door frame 28 may have any shape. As an example, the edges 24 of the door 9 or door frame 28 may be flat, curved, angled, or a combination thereof. As illustrated in FIG. 3B, top edge 24a and bottom edge 24b may each include side portions 25. The side portions 25 may be rounded or straight. As shown, the side portions 25 are angled and meet at a point; however, in at least one embodiment, the side portions 25 meet at an arc. The side portions 25 of top edge 24a and bottom edge 24b may have any angle. One or both side edges 24c, 24d may include a latch feature such as an extension, notch, or groove. As shown, the latch feature includes pins 73. The pins 73 may be fixed with respect to the door 9 or may be movable with respect to the door 9 by water flows as described in more detail below.

The door 9 may include faces 14, 15 disposed on opposing sides of the door 9. The faces 14, 15 may comprise panels configured to block passage of fluids or materials such as debris, water, and wind, for example, from passing through the scupper passageway 3. Although the door 9 is illustrated as including faces 14, 15 comprising solid panels, the door 9 may include any other type of face 14, 15. For example, one or both of the faces 14, 15 may include an open or mesh portion (not shown) that may allow air to pass through the door 9. In such an example, the size of the openings (or ports) may be sufficiently small to prevent (or substantially prevent) objects such as small animals from passing through the door 9 or scupper.

FIGS. 4A and 4B illustrate one embodiment of a scupper frame 10 for use with various embodiments of the scupper door system 100 (see, e.g., FIG. 2). The frame 10 may be configured to be installed or inserted into a new or existing scupper passageway 3 and therein define the passageway or portion thereof. As illustrated in FIGS. 5A and 5B, the frame 10 may be structured to receive the door 9 such that the door 9 may be movably mounted therein between a closed position, as shown in FIG. 5A, blocking the scupper opening, and an open position, as shown in FIG. 5B, to allow water 21 to pass through the scupper opening from side 18 and drain from side 17. As described herein, the door 9 may be triggered to move between the closed position and the open position by presence or action of a preset water condition such as an exteriorly directed or positioned flow or level of water 21.

With reference again to FIGS. 4A and 4B, the frame 10 includes a top edge 11a, a bottom edge 11b, and two side edges 11c and 11d. The edges 11 may define an outer perimeter of the frame 10. The frame 10 further includes a top rail 12a, a bottom rail 12b, and side rails 12c and 12d. The frame 10 also includes a top interior edge 13a, a bottom interior edge 13b, and two side interior edges 13c and 13d. The interior edges 13 of the frame 10 may define an inner perimeter of the frame 10. In this embodiment, the top interior edge 13a includes an extension 91 that extends beyond the top edge 24a of the door 9. In some embodiments, extensions 91 are provided at both opposing sides of the frame 10.

The frame 10 may have any shape or cross-section. For example, the frame 10 may have rectangular, round, geometric, or non-geometric shaped cross-sections. In a further example, the frame 10 may define a customized cross-section in the form of a design, such as an animal, letter, business logo or symbol, number, or other desired design. The frame 10 may also have any dimensions. For example, the illustrated frame 10 defines a rectangular cross-section and, in one embodiment, the top and bottom edges 1a and 1b may be approximately 16" long, and the side edges 11c and 11d may be approximately 8" long, thereby forming an 8"×16" rectangular outer perimeter. Furthermore, the top and bottom rails 12a and 12b may be approximately 17$^{11}/_{16}$" long, and the side rails 12c and 12d may be approximately 9$^{11}/_{16}$" long. The frame 10 may be formed of any material. For example, the frame 10 may be formed of a corrosion resistant material, such as a metal alloy, stainless steel, spring steel, plastic, a polymer, any other corrosion resistant material or any combination of the preceding.

With reference to FIG. 3A-FIG. 5B the door 9 may be movably mounted to the frame 10 (or multiple doors 9 may be movably mounted to multiple frames 10). As illustrated, the door 9 is pivotally mounted to the frame 10 at a pivot assembly 85 (see FIGS. 5A and 5B), thereby allowing the door 9 to pivot relative to the frame 10. The door 9 may be mounted to the frame 10 in any manner that allows the door 9 to pivot relative to the frame 10. For example, as shown, the pivot assembly 85 may include one or more pivot pins 86 that extend from the door 9. In such an example, the pivot assembly 85 may further comprise pivot slots 88 wherein the pivot pins 86 are configured to be received within the pivot slots 88 which may be disposed within the frame 10. In other embodiments, the pivot pins 86 may be disposed within the frame and the pivot slots 88 may be disposed on the door 9. The pivot slot 88 may include an opening 89 to receive the pivot pin 86. The slot 88 may extend from the opening 89 to portion 90 configured to retain the pin 86 such that the door may not be simply pushed back through the opening. For example, removing the door 9 may require vertically manipulating the door 9 such that the pivot pin 86 vertically translates within the pivot slots 88 beyond or within portion 90. As shown in FIG. 4B, the pivot slot 88 includes an opening 89 extending to a tortious portion 90. As another example, the pivot slot 88 may extend from the opening 89 to and angled portion 90 defining a declining angle, lip, crescent groove, or a T-shaped path.

Referring again to FIGS. 5A and 5B, and as introduced above, the scupper door system 100 may be configured to retain the door 9 in a closed position unless triggered by a water condition to release, open, or otherwise allow the door 9 to transition to an open position such that water 21 may drain from the first side 18 to the second side 17. The water condition may be, for example, a minimum hydrostatic or dynamic pressure of water or water level at the first side 18, e.g., a buildup of water or exteriorly directed water flows at the roof side of the scupper.

The scupper door system 100 may include a latch mechanism 70 configured to retain the door 9 in the closed position in the absence of the preset water condition. The latch mechanism 70 may be further configured to be triggered by the preset water condition to release the door 9 (or multiple latch mechanisms 70 that respectively release one of multiple doors 9 of the scupper door system 100). The latch mechanism 70 may also be configured to latch or otherwise maintain the door 9 in a closed position unless triggered to release or open the door 9 by the preset water condition, e.g., by the level, flow, or presence of water at side 18. At a time when the level of water 21 has decreased sufficiently so that the door 9 hangs substantially perpendicular to the lower edge 13b, the latch mechanism 70 may be reset, which in turn may return the door 9 to its pre-release position.

The latch mechanism 70 may include any type of device (or combination of devices) that may perform the above discussed functions. As an example, the pivot slots 88 may include portion 90 configured to retain the door 9 while also allowing the pivot pins 86 to rise within the pivot slot 88, thereby permitting the door 9 to rise in the presence of a sufficient level of water 21. In another embodiment, the pivot pins 86 may be vertically slidable with respect to the door 9 such that the door may be raised to a raised position, which may be triggered or assisted by exteriorly directed or positioned water 21. The frame 10 may include a space between the top interior edge 13a and the top edge 24a. Raising of the door 9 to the raised position may allow water 21 to pass below the door 9 and hence the scupper passageway for drainage of the roof. The pivot assembly 85 may be configured to allow the door to rotate toward the open position in the raised position. The latch mechanism 70 may comprise a raised surface, notch, or groove, such as slot 78, positioned along the bottom interior edge 13b of the frame 10 that cooperatively engages a raised surface, notch, or groove, such as retention pin 73 when the door 9 is in a closed position. The vertical position of the retention pin 73 may be fixed or slidably biased toward the bottom edge 24b or slot 78. As shown, the frame 10 may also include guides 84 to guide the retention pin 73 into slot 78 as shown in FIG. 5A to maintain the door 9 in the closed position.

As shown in FIG. 5B, when water 21 is present at side 18, such as adjacent face 15, the door 9 may be configured to be buoyant such that the water 21 acts to raise the door 9 to the raised position, vertically translating the pivot pin 86 within the pivot slot 88 portion, such that the retention pin 73 may withdraw from the retention slot 78. The pivot assembly 85 may be configured to allow the door to rotate toward the open position in the raised position. The latch mechanism 70 may be configured to be triggered for release by the preset water condition, e.g., by modification of the vertical extent the door 8 must be raised to withdraw the retention pin 73 from the retention slot 78. When the retention pin 73 is withdrawn from the retention slot 78, the door 9 may be released from retention in the closed position and thereafter be rotatable about the pivot assembly 85 on pivot pins 86 within pivot slots 88. The preset water condition, e.g., level, flow, of presence water 21 at side 18, may further apply hydrostatic or dynamic fluid pressure at the face 15 thereon driving the rotation the door 9, which passes retention pins 73 through channel 80, to transition the door 9 to the open position, allowing the water 21 to flow through the frame 10 to side 17. In another embodiment (not shown), the scupper door system 100 may include a biasing feature such as a spring to bias the door 9 toward the open position to assist the transition of the door 9 to the open position when the latch mechanism 70 is triggered. In another embodiment, the door 9 may be biased to the closed position such that when the level or flow of water 21 has decreased sufficiently the retention pin 73 may again be received within retention slot 78, resetting the latch mechanism 70 and returning the door 9 back to its closed pre-release position.

FIGS. 6A and 6B illustrate another embodiment of the scupper door system 100 comprising a latch mechanism 70 wherein the latch mechanism 70 comprises a float 72 that is floatable by a preset water condition comprising a level or flow of water 21 to trigger release of the latch mechanism 70. The door 9 may be pivotably mounted within the frame 10 at a pivot assembly 85. The pivot assembly 85 may comprise a pivot pin 86 and a pivot slot (not visible in the illustrated views) in which the pin 86 may pivot. The pivot slot may be similar to the pivot slot described above. However, the particular path of the slot may differ. For example, the slot may or may not limit vertical translation of the door 9 when the door 9 is in the closed or a perpendicular position with respect to the lower edge 13b. It is to be appreciated while the door 9 is illustrated as including the pivot pin 86, in another embodiment, the door 9 may define a pivot slot and the frame may include a pivot pin. Furthermore, any suitable known pivot assembly about which the door 9 may pivot may be used. Thus, in some embodiments, the pivot assembly 85 may not include a pivot pin 86 and pivot slot. Although the float 72 is positioned within the door 9, the latch mechanism 70 may be configured such that float 72 is disposed along the face 15, at side 18, bottom edge 24b, or other position in fluid communication with side 18. Floats 72 may be positioned on both lateral sides of the door 9, e.g., adjacent to side edges 24c, 24d, or at one or more positions therebetween. Once the float 72 is lifted by the water 21 to a preset level the retention pin 73 is withdrawn from retention slot 78 and the door 9 is released. Many other types of devices are capable of sensing the float 72 at a preset level and capable of subsequently triggering release the door 9, and the present disclosure is not limited as to other such water triggerable releasing devices.

Figure 7A:
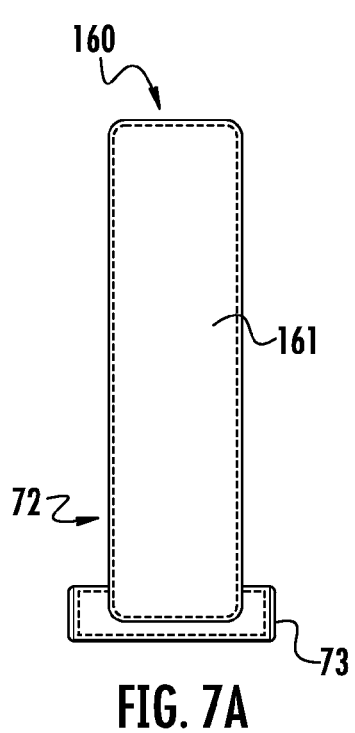
FIGS. 7A-7D illustrate a float for a scupper door according to various embodiments.
Figure 7B:
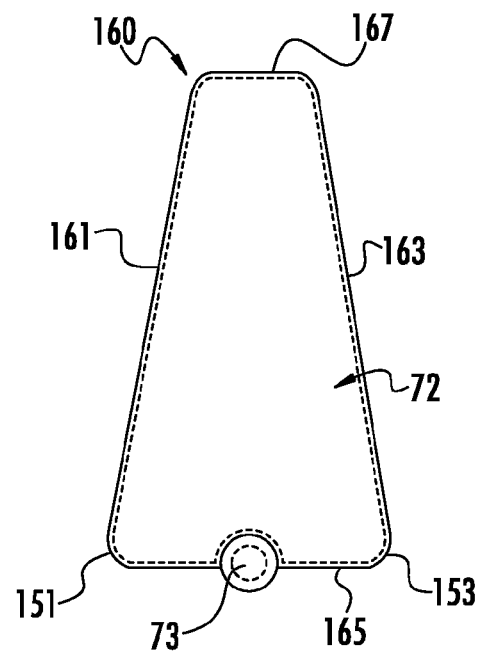
Figure 7C:
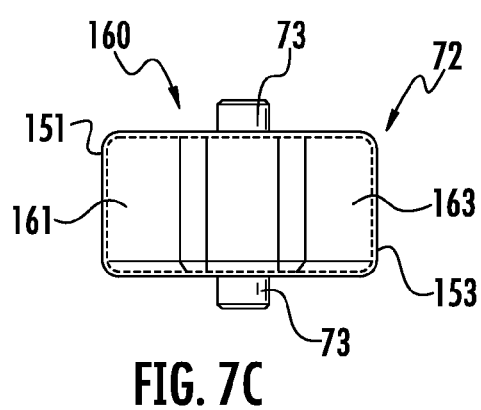
Figure 7D:
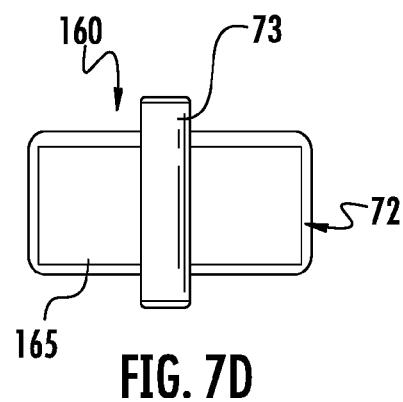

In one arrangement, referring to FIGS. 7A and 7B, the latch mechanism 70 comprises a retention pin 73 extending from a float 72, wherein the retention pin 73 is adapted to be inserted into a retention slot 78 in the frame 10. As illustrated in FIG. 7A, when the retention pin 73 is positioned within the retention slot 78, the door 9 may be prevented from pivoting in one or both directions and thereby retained in a closed position. The position of the opening of the retention slot 78 may correspond or otherwise determine the level of water 21 at which the door 9 may open. Once the float 72 is lifted by the water 21 such that the retention pin 73 is withdrawn from the slot 78 through the opening, the retention pin 73 is no longer constrained by the retention slot 78 and may thereafter rotate in the direction of the current of the water 21, as illustrated in FIG. 7B.

The frame 10 may also include a channel 80 as described above which may allow the retention pin 73 to pass through the frame 10 as the door 9 rotates. The width of the channel 80 may be sized to allow the retention pin 73 to move therethrough corresponding to the desired range of rotation of the door 9 about the pivot assembly 85. In some embodiments, the channel 80 extends only along the portion of the side edge 13c, 13d positioned at the drainage side 17 of the scupper passageway 3 with respect to the retention pin 73. The range of movement of the retention pin 73 may be constrained by a pin slot 82 defined in the door 9 through which the retention pin 73 extends.

Use of the float 72, retention pin 73, and retention slot 78 may also operate as a resetting mechanism to reset the latch mechanism 70. For example, when the water level sufficiently drops, the retention pin 73 may be lower than the opening in the retention slot 78 if the door 9 is at a substantially perpendicular position. The door 9, however, may not be perpendicular until the weight of the door 9 overcomes the force of the current or flow of water 21 pushing against the door 9. To assist the resetting process, one or more guides 84 may be disposed on the frame 10. The guides 84 may be used to position the retention pin 73 in the retention slot 78. The guides 84 may be used when the door 9 returns to a substantially perpendicular position, which, in this embodiment, occurs when the level of water 21 is lower than the opening in the retention slot 78. The guides 84, which may be disposed on both sides of the retention slot 78, may be angled upward to position the retention pin 73 upward as the door 9 rotates to a substantially perpendicular position. Once the door 9 reaches this position, the retention pin 73 may be at the level of the opening of the retention slot 78, such that when the retention pin 73 is positioned over the opening, the retention pin 73 may fall into the open retention slot 78 thereby resetting the latch mechanism 70.

The latch mechanism 70 may be any structure suitable for responding to or sensing the preset water condition, e.g., operatively triggerable to release the door 9 in the presence of the preset water condition, such as the level of water passing into the scupper passageway 3 and releasing the door 9 at a preset water level. The latch mechanism maybe configured to translate force or otherwise utilize energy, for example hydrostatic or dynamic water pressure, associated with the preset water condition as the force to release the door 9. Additional structures, such as paddles, levers, tabs, and paddle wheels, may be used independently, or in addition to the above-described latch mechanism 70 to sense the water level and to release the door 9.

Water flowing to side 18 the scupper passageway 3 may rise and recede very slowly or very quickly. The latch mechanism 70 may be configured to utilize the force of flowing water to release the door 9. Referring to FIGS. 7A-7D, the latch mechanism 70 may include an actuating structure 160, which may translate the force of flowing water into a lifting force to trigger release of the latch mechanism 70 and translate the door 9 from the closed position to an open position. The actuating structure 160 may include a float 72. The float 72 may be configured to have a paddle-like configuration so that it may be displaced along a predetermined trajectory by the force of flowing water.

Figure 9:
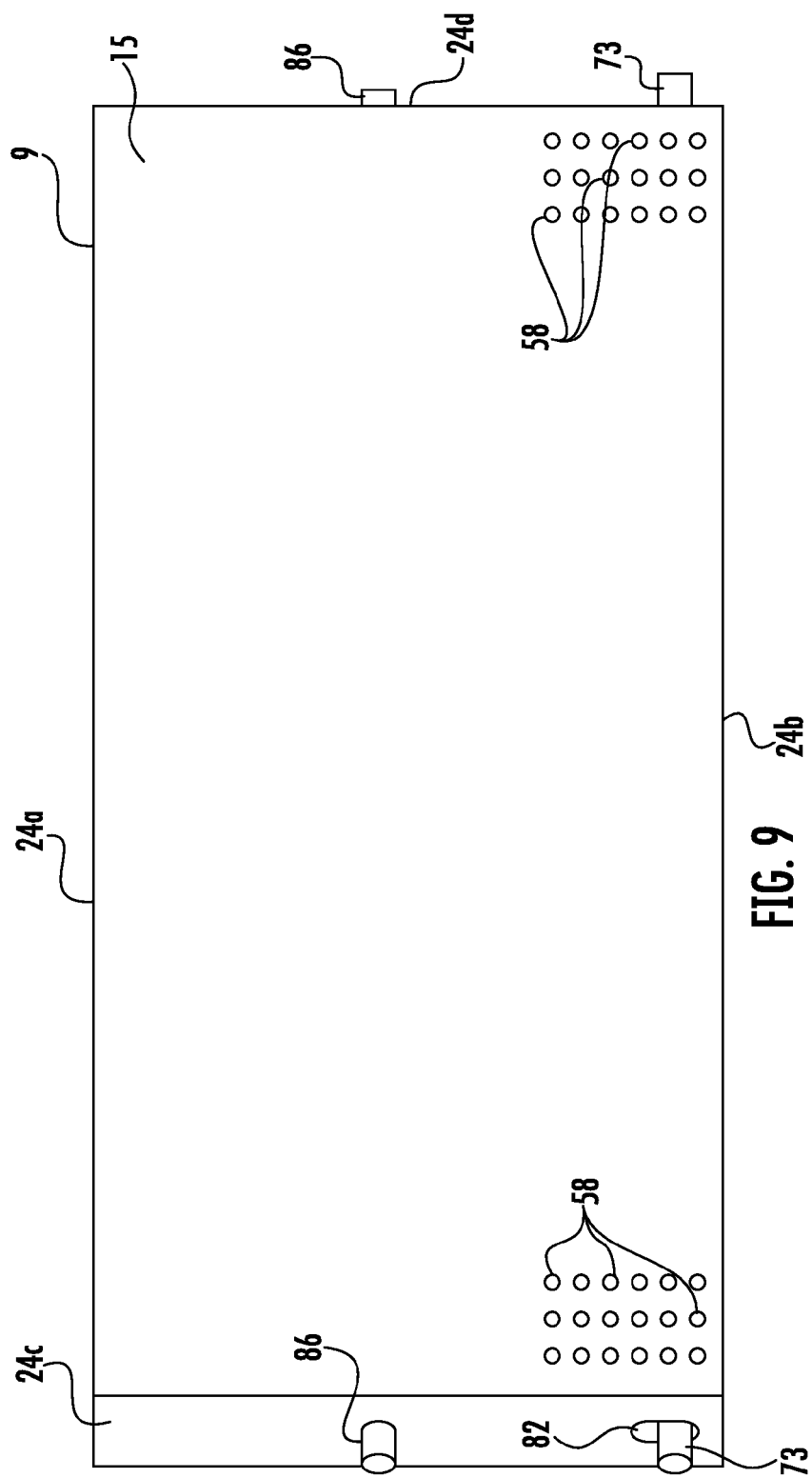
FIG. 9 illustrates a scupper door according to various embodiments.

The float 72 may include a bottom surface 165 contacting a retention pin 73. The float 72 may have any suitable configuration, however, the float 72 is preferably configured to translate the force of water flowing through the scupper passageway 3 into an actuating force to withdraw the retention pin 73 from the retention slot 78 thereby causing the door 9 to open. As shown in FIG. 9, the door 9 may include one or more fluid ports 58 to channel water directly to the float 72. The fluid ports 58 may allow water to enter into a float chamber 52 within the door 9 as well as drain from the float chamber 54 when the water level drops. Fluid ports 58 may be any shape such that water of sufficient depth may enter the chamber 54. For example, fluid ports 58 may comprise circular, rectangular, arcuate, regular or irregular shapes. The number and size of fluid ports 58 may be configured to control the rate of water 21 that may enter the chamber 54. Fluid ports 58 are typically defined at the side 18 face 15 of the door 9. However, in one embodiment, fluid ports 58 may be defined in both faces 14, 15 of the door 9.

Referring again to FIG. 7B, in one arrangement, the float 72 may have a paddle-like configuration with a front surface 161 and a rear surface 163. The front and rear surfaces 161, 163 may be oriented substantially perpendicular to the direction of inward and outward water flow within the scupper passageway. In the illustrated embodiment, the front and rear surfaces 161, 163 flare outwardly to provide a narrower upper portion 167 and a wider bottom surface 165; however, the present disclosure is not limited in this regard, as the float 72 may be any configuration suitable for transforming forces from flowing water into rotation by the door 9. The front and rear surfaces 161, 163 may intersect with the bottom surface 165 to define lower edges 151, 153. The lower edges 151, 153 may be any suitable shape in order to serve as rotational points to allow the float 72 to pivot backwards or forwards on a surface. For example, the lower edges 151, 153 may be rounded, as shown in FIG. 7B. In addition, the lower edges 151, 153 may also be sharp corners.

FIGS. 8A-8F illustrate one embodiment of the scupper door system 100 comprising float 72 positioned within the door 9. FIG. 8A shows the position of the float 72 when the level of water 21 at the first side 18 of the scupper passageway 3 is insufficient to displace the float 72. The door 9 may be in a vertical, closed position, and the retention pin 73 may be seated in the retention slot 78. When the float 72 is not displaced by the water 21, the rounded edges 151, 153 may rest on the base 29 of the door frame 28. The retention slot 78 may be configured to functionally engage the configuration of the float 72 to facilitate the opening of the door 9 when the water 21 rises to a sufficient level. The rounded edges 151, 153 may allow the float 72 to rotate about oppositely disposed fulcrum points 181, 182 on the base 29.

FIGS. 8B-8F illustrate the action of flowing water 21 on the float 72. As shown in FIG. 8B, flowing water 21 may enter the door 9 through the fluid ports 58 (see, e.g., FIG. 9) in face 15. The dynamic pressure or force of the flowing water 21 may tilt the float 72 and may cause the float 72 to pivot on the rounded edge 153 at the fulcrum point 182. This motion may lift the float retention pin 73 out of the retention slot 78, which may release the door 9, thus permitting the door 9 to be rotated about the pivot assembly 85 and transition to the open position by the flow of the water 21. The pin slot 82 defined along the side edge 24c, 24d may constrain the upward movement of the float 72. In FIGS. 8C and 8D, the force of the flowing water may push the rear surface 163 of the float 72 against the door 9 thereby forcing the door 9 into the open position. As shown in FIG. 8E, it may be seen that the channel 80 may allow the passage of the retention pin 73 through the frame 10. As shown in FIG. 8F, once the door 9 has rotated into the fully open position, the force of the current and the buoyancy of the float 72 may maintain the door 9 in the open position. The float 72, door frame 28, and channel 80 are preferably symmetrically constructed to allow the door 9 to be opened by the inflow and outflow of water into the scupper passageway 3.

After the level of water 21 has dropped, the above-described arrangement of the float 72, the float retention pin 73, door frame 28, and the retention slot 78 may function as a resetting mechanism. That is, when the level of water 21 has sufficiently receded, the float 72 may tilt on the fulcrum point 182 back to its original position, and the float retention pin 73 may rotate back into the open retention slot 78 to latch the door 9.

In the event that the incoming water 21 rises slowly and does not have sufficient current flow to push the float 72, the buoyancy of the float 72 may lift the float retention pin 73 out of the retention slot 78, and the door 9 may be released in the manner described in the previous embodiment, which may be driven, for example, by a hydrostatic pressure associated with the water 21. The door 9 may thus be released by the buoyancy of float 72, by the force of flowing water pushing on the float 72, or by a combination of these two methods working in cooperation to release the door 9.

Figure 10A:
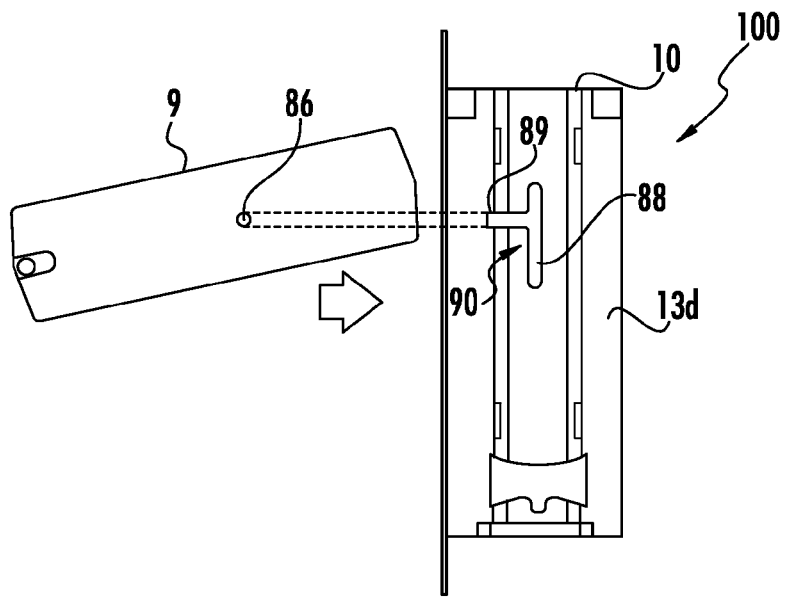
FIGS. 10A-10C illustrate a method of installing a scupper door of a scupper door system according to various embodiments.
Figure 10B:
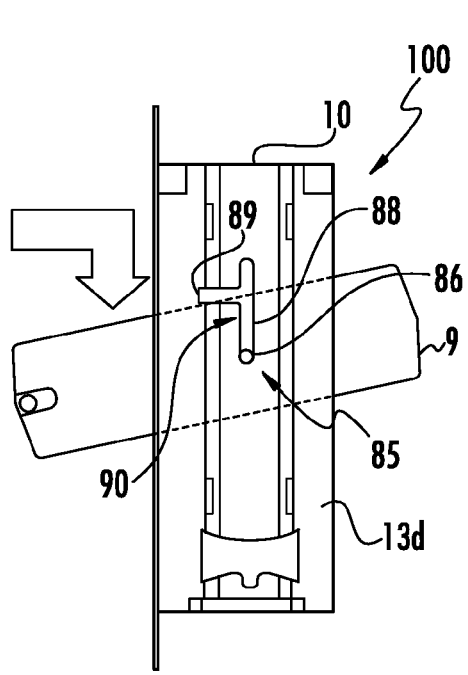
Figure 10C:
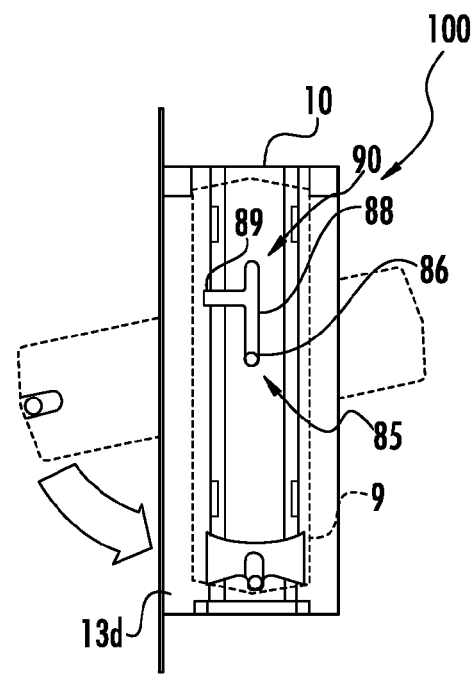

FIGS. 10A-10C illustrate one way to insert the door 9 into the frame 10. As shown in FIG. 10A, the door 9 may be held substantially perpendicular to the frame 10 and may then be inserted into the frame 10 by positioning the pivot pins 86 on the door 9 into the opening of the pivot slot 88 in the frame 10. The opening 89 of the pivot slot 88 may be positioned slightly higher than the final vertical position of the pivot pins 86 so that the door 9 may be rotated substantially perpendicular to the frame 10. Once each pin 86 is in its respective pivot slot 88 along the retention portion 89, as shown in FIGS. 10B and 10C, the pivot pin 86 may be constrained from movement in any direction except along the length of the pivot slot 88. The bottom of the pivot slot 88 may define the final horizontal and vertical position of the pivot pins 86.

As can be seen in the illustrated scupper door system 100, the configuration of the pivot slot 88 may limit the translational movement of the pivot pin 86, even if the pivot pin 86 is moved slightly upward. Also, this feature may prevent the door 9 from being removed from the frame 10 when the door 9 is in a closed positioned. Thus, to remove the door 9, the door 9 must be positioned at an angle so that the pivot pins 86 may be lifted upward in the pivot slot 88 and then towards the opening of the pivot slot 88. The portion 90 of the pivot slot 88 may continue vertically past the opening 89 of the pivot slot 88 which may reduce the possibility of unauthorized or accidental removal of the door 9.

As is described above, a scupper door system 100 may include a latch mechanism 70 that may release the door 9 of the scupper door system 100, allowing the door 9 to translate from a closed position to an open position so that waters 21 may pass through the scupper passageway 3 and drain from the drainage side. Such a latch mechanism 70 may typically include extensions, such as pins 73, that extend into a slot, such as slot 78, to retain the door 9 in a closed position. When a preset water condition is present, such as a preset level or presence of water 21, the pin 73 may move out of the slot to allow the door to translate to the open position. In one embodiment, a pin 73 that extends from a float 72 into the slot 78 on the inner side edge of the frame 10, locking the door 9. Additionally, such a latch mechanism 70 may include a channel 80 in the inner side edge of the frame 10 that allows the pin 73 to pass through the frame 10 as the door 9 rotates about the pivot assembly 85. Examples of such latch mechanisms 70 are described above with regard to latch mechanism 70, retention pins 73, retention slot 78, and channel 80 of FIGS. 3A-10C. Those having skill in the art will appreciate that relative movement between the pin and slot to move the pin from the slot may be due to one or both of the movement of the pin 73 or slot 78 relative to the frame 10 or door 9 wherein the movements are triggered by the preset water condition. It will be further appreciated by those skilled in the art that the latch mechanism 70 may include pins 73 that are associated with the frame 10 and slots 78 that are associated with the door 9. Thus, a float 72 may define the slot 78 for receiving the pin 73 extending from the frame 10 such that when the water 21 comprising the preset water condition raises the float 72 to the preset water level, the float 72 lifts to withdraw the pin 73 from the slot 78, allowing the door 9 to transition to the open position, which may be driven by a flow of water 21 draining through the scupper passageway 3 or may be driven or assisted by a biasing mechanism such as a spring or coil.

Figure 11A:
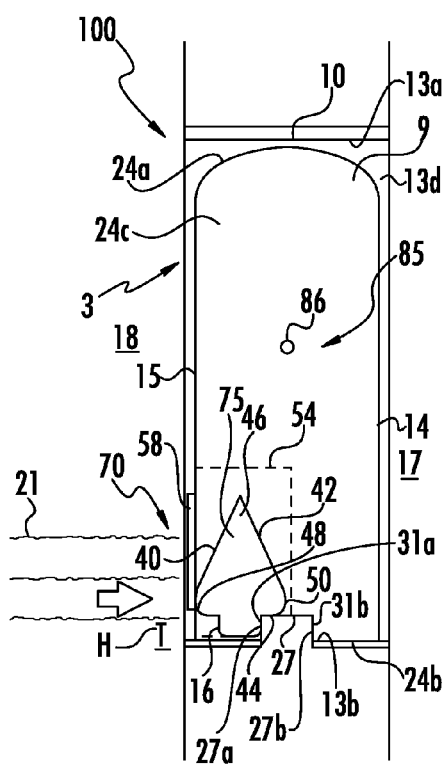
FIGS. 11A and 11B illustrate a scupper door system according to various embodiments.
Figure 11B:
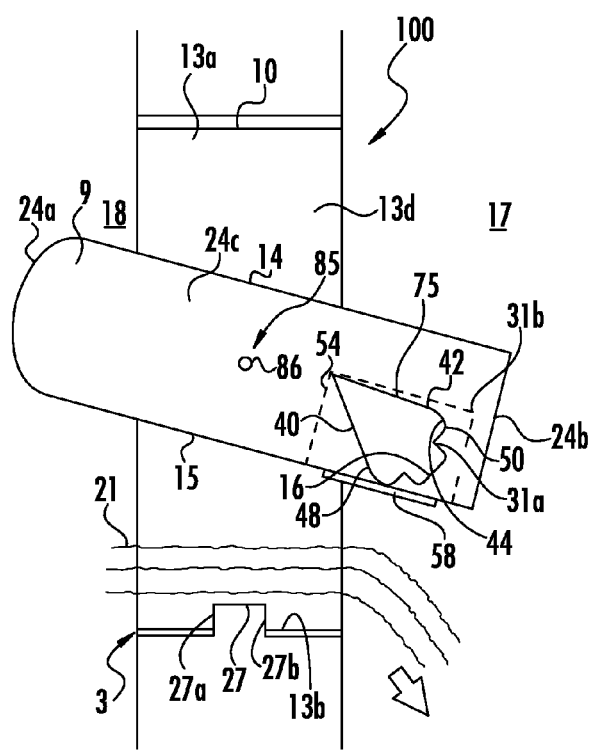

As also described above, other latch mechanisms 70 may be used. For example, FIGS. 11A and 11B illustrate a further embodiment of the scupper door system 100 comprising a latch mechanism 70 configured for vertical latch. As illustrated, the scupper door system 100 includes a frame 10 and the door 9, examples of which are described above with respect to FIGS. 3A-4B. The door 9 may be pivotably mounted within the frame 10 at a pivot assembly 85. The pivot assembly 85 may comprise a pivot pin 86 and a pivot slot (not visible in the illustrated views) in which the pin 86 may pivot. The pivot slot may be similar to the pivot slot described above. However, the particular path of the slot may differ. For example, the slot may or may not limit vertical translation of the door 9 when the door 9 is in the closed or a perpendicular position with respect to the lower edge 13b. It is to be appreciated while the door 9 is illustrated as including the pivot pin 86, in another embodiment, the door 9 may define a pivot slot and the frame may include a pivot pin. Furthermore, any suitable known pivot assembly about which the door 9 may pivot may be used. Thus, in some embodiments, the pivot assembly 85 may not include a pivot pin 86 and pivot slot. The latch mechanism 70 may be triggerable by a preset water condition such as a level or flow of water 21 at side 18, as described above, to release the door 9, thereby allowing the door 9 to pivot from a closed position to an open position. The latch mechanism 70 may operate by responding to, sensing, or otherwise being triggerable by present water condition at side 18 of the scupper passageway 3 to thereby release of the door 9 when the water 21 reaches a preset level, e.g., height, flow rate, pressure. As above, a force or energy associated with the preset water condition may be used to drive the release, e.g., withdraw of pin 73. The latch mechanism 70 may include one or more floats 75 that may be lifted or lowered by the level or flow of water. The float 75 may be configured to allow the door 9 to pivot on pivot assembly 85 pivot pins 86, which may be configured similarly as those described above. The float 75 may have a blocker 16. The blocker 16 may extend out of the bottom edge 24b of the door via an opening (not shown) such that a blocking surface 31a is presented counter to rotation of the door 9. For example, the blocker 16 may extend vertically below the height H of a blocker plate 27 formed along the bottom interior edge 13b of the frame 10, so as to contact the blocking surface 31a to one of the blocking surfaces 27a, 27b of the blocker plate 27. As such, the blocker 16 may prevent the door 9 from pivoting when the blocker 16 is in contact with the blocker plate 27. When the float 75 is lifted by water 21, the blocker 16 may also be lifted. Furthermore, when the blocker 16 is lifted above the height H of the blocker plate 27, the door 9 may pivot to an open position as shown in FIG. 11B, allowing the water to pass through the scupper passageway 3 and be drained from side 17.

Floats 75 may be positioned within the door frame 28. The position of the float 75 may be configured to allow one or more blockers 16 to be in contact with the blocking surface 27a of blocker plate 27. The bottom edge 24a of the door 9 may include a fixed blocking surface 31b configured to extend below the height H of the blocker plate 27 at the drainage side 17 of the door adjacent to face 14. When the blocker 16 and fixed blocking surface 31b are in contact with blocking surfaces 27a, 27b of blocker plate 27, the door 9 may be prevented from pivoting open. It is also contemplated that additional floats 75 may be positioned within the door frame 28 adjacent to face 14. As water level rises, the float 75 rises causing the blocker 16 to be lifted above the height H of the blocker plate 27 to trigger the release of the door 9, freeing the door 9 to rotate to the open position, as shown in FIG. 11B.

In various embodiments, floats 75 may be positioned at any location along the length of the door 9. For example, a float 75 may be positioned in the middle of the door 9, adjacent the side edge 24c of the door 9, adjacent the side edge 24d of the door 9, or any other location along the length of the door 9. In one embodiment, fixed blocking surface 31b may be replaced with a blocking surface that is movable by the preset water condition, e.g., operatively associated with float 72 or another float.

Floats 75 may have any shape. As one example, the float 75 may have a paddle-like shape so that it may be displaced along a predetermined trajectory by the force of flowing water, such as water. As illustrated, the float 75 may have a paddle-like configuration with a front surface 40 and a rear surface 42. The front surface 40 may be oriented substantially perpendicular to the direction of inward flow of water 21 within the scupper door system 100. As illustrated, the front and rear surfaces 40 and 42 may flare outwardly to provide a narrower upper portion 46 and a wider bottom surface 44. The front and rear surfaces 40 and 42 may intersect with the bottom surface 44 to define lower edges 48 and 50. The lower edges 48 and 50 may be any shape configured to serve as rotational points to allow the float 75 to pivot backwards or forwards on a surface. For example, the lower edges 48 and 50 may be rounded, or may be sharp corners. Additionally, as is discussed above, the float 75 may include a blocker 16, which may also have any shape.

A float 75 may be further positioned within a chamber 54 in the door 9. The chamber 54 may provide the float 75 with space to be operatively lifted, lowered, leveraged, rocked, etc. by water as described. Furthermore, the chamber 54 may have an opening in the bottom edge 24b of the door 9, which may allow the blocker 16 to extend below the bottom edge

24b of the door 9. The chamber 54 may have any shape and/or size. In particular embodiments, the chamber 54 may be shaped and/or sized to prevent the float 75 (and blocker 16) from becoming misaligned (which, in particular embodiments, could prevent the blocker 16 from being lowered back through the opening in the bottom edge 24b of the door 9). For example, the bottom of chamber 54 may be sloped to direct the blocker 16 towards the opening. The chamber 54 may further have a fluid opening 58 that may allow water 21 to enter the chamber 54, so as to lift the float 75. As described above, fluid ports 58 may be any shape such that water 21 of sufficient depth may enter the chamber 54. In particular embodiments, each chamber 54 may have its own fluid opening 58, and each chamber 54 may further not be in fluid communication inside of door 9 with any other chambers 54.

As one example of the operation of the latch mechanism 70 illustrated in FIGS. 11A and 11B, the float 75, which may be multiple floats 75 disposed along the length of the door 9, may be initially positioned within their respective chambers 54 so that blocking surfaces 31a of blockers 16 extend out of the bottom edge 24b of the door, and contact the blocker plate 27 at the blocking surface 27a. The fixed blocking surface 31b may also contact the blocker plate 27 at the opposing blocking surface 27b. As a result of this contact with the blocking surfaces 27a, 27b of the blocker plate 27, the float 75 and fixed surface 31b may cooperatively prevent the door 9 from rotating about the pivot assembly 85 to the open position. When confronted with rising water 21 at side 18, the water 21 may eventually enter chamber 54 through fluid ports 58. The water 21 may cause float 75 to float upward (or to rise and tilt to one side), which may cause the blocker 16 or blocking surface 31a thereof to no longer extend below the height H of the blocker plate 27 and therefore discontinue blocking contact with blocking surface 27a of blocker plate 27. As a result, the door 9 may be released, and the force or pressure exerted by the water 21 may then cause the door 9 to rotate open toward side 17 for drainage of the water therefrom. Furthermore, when the water 21 is drained, the reduction in force at face 15 may cause the door 9 to rotate back to a closed position. Then, when the float 75 is lowered, the blocker 16 may once again extend below the bottom edge 24b of the door 9 and be in contact with blocking surface 27a of the blocker plate 27. As such, the float 75 and fixed surface may once again prevent the door 9 from pivoting to the open position.

Figure 12:
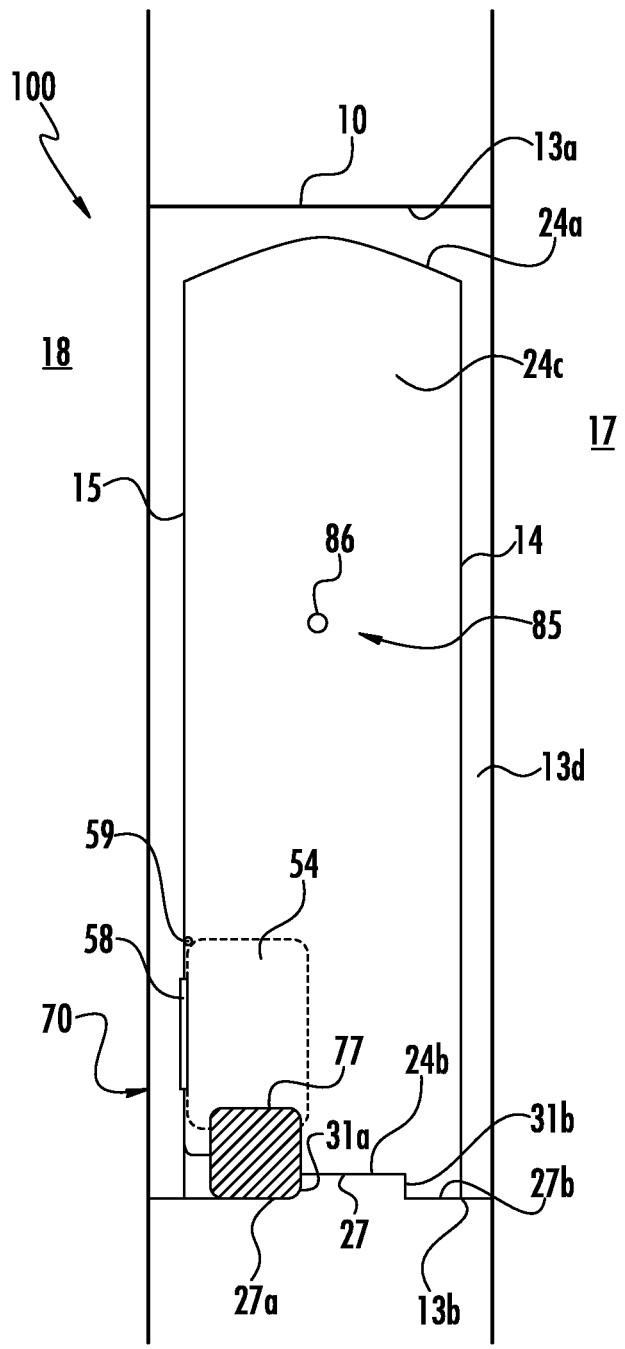
FIG. 12 illustrates a scupper door system according to various embodiments.

FIG. 12 illustrates another embodiment of the scupper door system 100 wherein the latch mechanism 70 comprises a fluid modifiable material 77. The door 9 and latch mechanism 70 may be similar to that described with respect to FIGS. 11A and 11B; however, in this embodiment, the blocker comprises a fluid modifiable material 77. The fluid modifiable material 77 may include a blocking surface 31a and be dimensioned to be positioned or lodged between the door 9 and a blocking surface of or attached to the frame 10, such as blocking surfaces 27a, 27b. As with blocker 16, multiple fluid modifiable materials 77 may be positioned to prevent rotation of the door 9, e.g., at both blocking surfaces 27a, 27b, or a fixed blocking surface 31a may be used. In another embodiment (not shown), a notch may be defined in the lower edge 13b of the frame 10 configured to receive the fluid modifiable material 77 such that, when received, the fluid modifiable material 77 blocks rotation of the door in both directions. The door 9 may be pivotably mounted within the frame 10 at a pivot assembly 85. The pivot assembly 85 may comprise a pivot pin 86 and a pivot slot (not visible in the illustrated views) in which the pin 86 may pivot. The pivot slot may be similar to the pivot slot described above. However, the particular path of the slot may differ. For example, the slot may or may not limit vertical translation of the door 9 when the door 9 is in the closed or a perpendicular position with respect to the lower edge 13b. It is to be appreciated while the door 9 is illustrated as including the pivot pin 86, in another embodiment, the door 9 may define a pivot slot and the frame may include a pivot pin. Furthermore, any suitable known pivot assembly about which the door 9 may pivot may be used. Thus, in some embodiments, the pivot assembly 85 may not include a pivot pin 86 and pivot slot.

The fluid modifiable material 77 may include a gel, foam, polymer, compact, or compressed compositions modifiable by waters. In some embodiments, the fluid modifiable material 77 comprises materials configured to at least partially dissolve or breakdown upon exposure to water 21. For example, in one embodiment, the fluid modifiable material 77 comprises a water soluble mass such as sugars or starches or a composition comprising corn starch and a polyvinyl, for example, configured to dissolve or deteriorate when contacted by water. The fluid modifiable material 77 may be formed into any shape suitable to function as a blocker. In one embodiment, the fluid modifiable material 77 comprises pieces, pellets, or cubes. Access of water 21 to the fluid modifiable material 77 may be prevented in the absence of the preset water condition. Because the retaining operation provided by the fluid modifiable material 77 is generally temporary and not resettable, the face 15 of the door 9 may be configured for quick access to the chamber 54. For example, a hinge 59 or notch and groove configuration may be included at the face 15 to open or remove a portion of the face to access the chamber 54.

Figure 13:
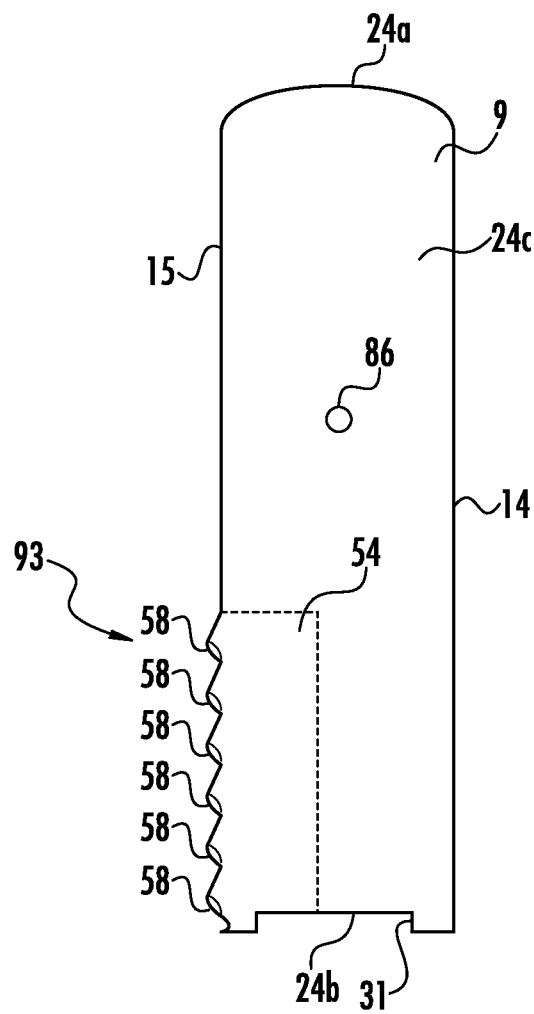
FIG. 13 illustrates a scupper door according to various embodiments.

FIG. 13 illustrates one embodiment of a door 9 comprising a rain guard 93. Scupper passageways 3 are typically exposed to the weather, such as rain. To prevent rain from entering the chamber 54 of a door 9, in some embodiments, scupper door systems 100 include a rain guard 93. Rain guards 93 may be overhead coverings, awnings, or extensions positioned to limit falling rain from entering the chamber 54, e.g., through fluid ports 58. Rain guards 93 may be particularly useful in embodiments utilizing fluid modifiable materials as described above. The illustrated rain guard 93 includes angled surfaces along the face 15 and fluid ports 58 that are at least partially angled downward. In other embodiments, the chamber 54 may include angled surfaces position to direct water droplets way from the fluid modifiable material. For example, absent a water level at a preset height, water entering the chamber will be directed out of the chamber 54 along the angled surface. The fluid ports 58 may also be positioned along the lower edge 24b of the door 9 or adjacent thereto to allow water of insufficient water conditions to circulate out the chamber 54. In other embodiments, doors 9 may also include louvers positioned to direct falling water away from the door.

Figure 14:
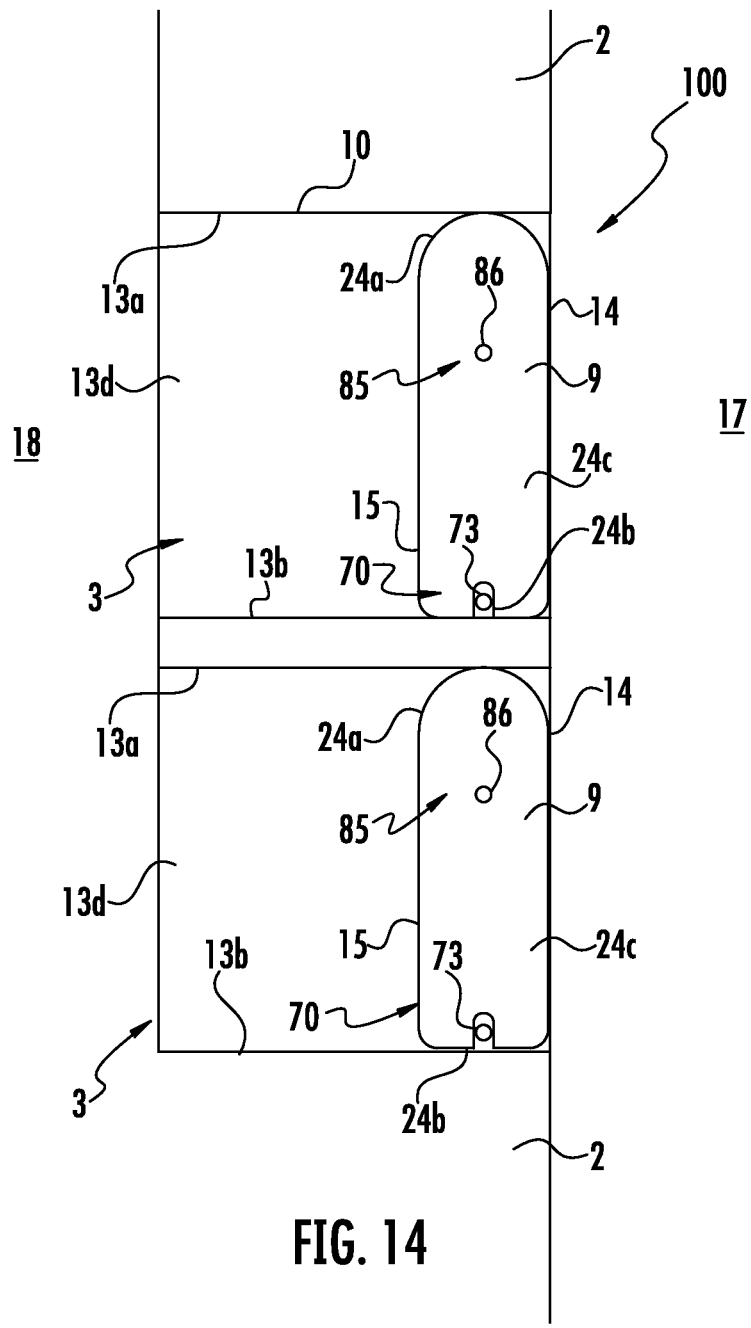
FIG. 14 illustrates a scupper door system according to various embodiments.
Figure 15:
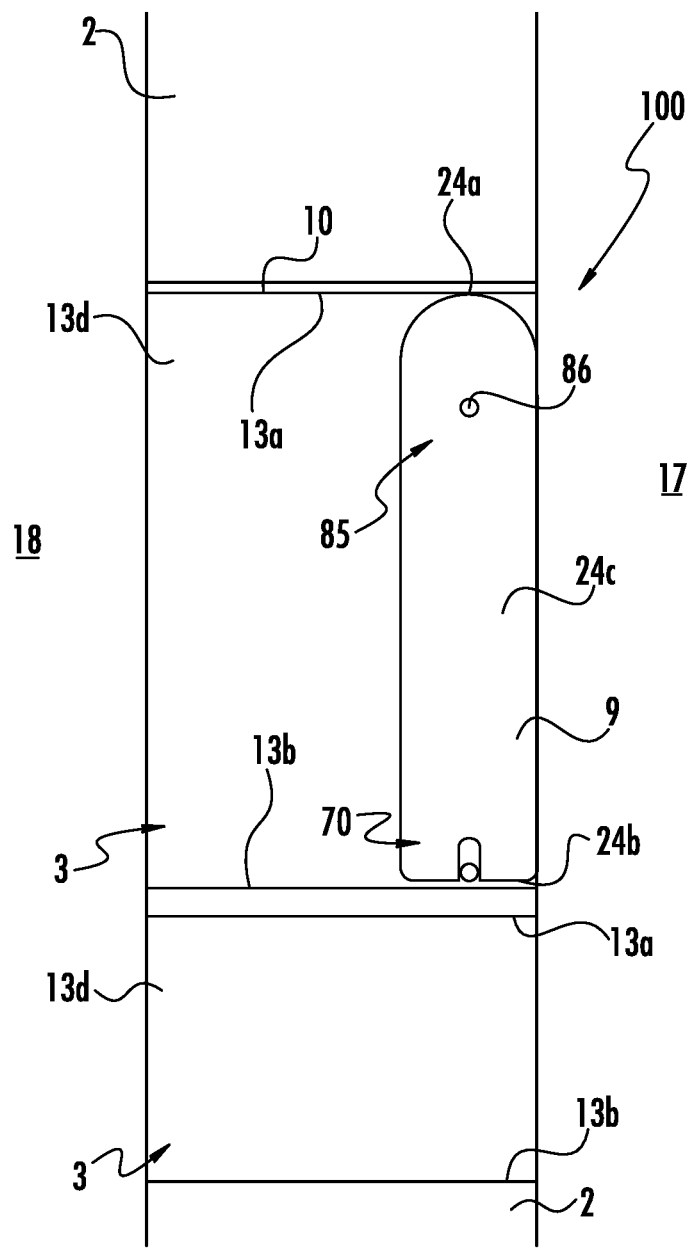
FIG. 15 illustrates a scupper door system according to various embodiments.

As shown in FIGS. 14 and 15, in various embodiments, the scupper door system 100 may include multiple framed scupper passageways 3 or multiple doors 9 positioned within a scupper passageway 3. For example, a scupper door system 100 may define two framed scupper passageways 3 (or two or more frames) stacked on top of each other (and coupled together), along with one or more doors 9 attached to each framed scupper passageway 3. The doors 9 may include similar features and operations as those described above.

In one example, more than one scupper passageway 3 comprising a scupper door 9 may be stacked as shown in FIG. 14. In another example, More than one scupper passageways 3 may be stacked wherein one or more scupper passageways 3 do not include a door 9 as shown in FIG. 15. The frame 10 may therefore define multiple scupper passageways 3. Such configurations may be desirable in areas requiring high drainage capabilities or to retrofit large primary scupper passageways, e.g., into multiple smaller scupper passageways 3 in height or width. Such formations may also be desirable in area requiring low levels of drainage the level of which may not be sufficient otherwise to open a large scupper door 9. For example, multiple stacked smaller doors 8 may be used to provide low levels of drainage through scupper passageways 3 positioned along low portions while also providing capacity for heavy drainage requirements through scupper passageways 3 positioned along upper portions of the system 100. As another example, a scupper door system (not shown) may include two frames (or two or more frames) positioned horizontally next to each other (and coupled together), along with one or more doors attached to each frame. As a further example, a scupper door system (not shown) may include two frames (or two or more frames) stacked on top of each other and two frames (or two or more frames) positioned horizontally next to each other (and these four or more frames may be coupled together), along with one or more doors attached to each framed passageway a scupper door system may include multiple doors or scupper passageways that may be installed in a stacked, modular formation.

This disclosure describes various elements, features, aspects, and advantages of various embodiments of the stopping systems, apparatuses, and methods thereof. It is to be understood that certain descriptions of the various embodiments have been simplified to illustrate only those elements, features and aspects that are relevant to a more clear understanding of the disclosed embodiments, while eliminating, for purposes of brevity or clarity, other elements, features and aspects. Any references to "various embodiments," "certain embodiments," "some embodiments," "one embodiment," or "an embodiment" generally means that a particular element, feature and/or aspect described in the embodiment is included in at least one embodiment. The phrases "in various embodiments," "in certain embodiments," "in some embodiments," "in one embodiment," or "in an embodiment" may not refer to the same embodiment." Furthermore, the phrases "in one such embodiment" or "in certain such embodiments," while generally referring to and elaborating upon a preceding embodiment, is not intended to suggest that the elements, features, and aspects of the embodiment introduced by the phrase are limited to the preceding embodiment; rather, the phrase is provided to assist the reader in understanding the various elements, features, and aspects disclosed herein and it is to be understood that those having ordinary skill in the art will recognize that such elements, features, and aspects presented in the introduced embodiment may be applied in combination with other various combinations and sub-combinations of the elements, features, and aspects presented in the disclosed embodiments. It is to be appreciated that persons having ordinary skill in the art, upon considering the descriptions herein, will recognize that various combinations or sub-combinations of the various embodiments and other elements, features, and aspects may be desirable in particular implementations or applications. However, because such other elements, features, and aspects may be readily ascertained by persons having ordinary skill in the art upon considering the description herein, and are not necessary for a complete understanding of the disclosed embodiments, a description of such elements, features, and aspects may not be provided. As such, it is to be understood that the description set forth herein is merely exemplary and illustrative of the disclosed embodiments and is not intended to limit the scope of the invention as defined solely by the claims.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

It will be further appreciated that for conciseness and clarity, spatial or relative terms such as "vertical," "horizontal," "upper," "lower," "lateral," "longitudinal," and others may be used herein with respect to the illustrated embodiments. However, vents 10 may be used in many orientations and positions, as such, these terms are not intended to be limiting and absolute. All numerical quantities stated herein are approximate unless stated otherwise, meaning that the term "about" may be inferred when not expressly stated. Additionally, in some illustrative embodiments, dimensions including a parameter, measurement, diversion, or range may be given. It is to be understood that any such parameter, measurement, diversion, or range is provided as an illustrative example or instance of an embodiment and is not intended to limit that or other embodiments. For example, unless otherwise specified, illustrations of dimensions and how such parameters or measurements of such dimensions relate to other parameters, e.g., with respect to movement, support, engagements, interfacing dimensions are provided to aid the reader's understanding of the features and may not be illustrated to scale nor universally applicable to every embodiment.

What is claimed is:

1. A scupper door system, the system comprising:
a scupper frame defining a passageway between an interior side and an exterior side of a parapet positioned on a roof;
a door mounted within the frame at a pivot, wherein the door is rotatable about the pivot within the passageway between a closed position and an open position, wherein in the closed position the passageway is blocked and in the open position the passageway is open to permit passage of water therethrough;
a latch mechanism configured to retain the door in the closed position and triggerable by presence of a preset water condition at the interior side to release the door from the closed position and allow the door to rotate to the open position in a first direction; and
wherein the scupper door system is configured to prevent the door from rotating to the open position in a second direction opposite of the first direction where the latch mechanism comprises a retention pin and a retention slot, wherein the retention pin is positioned to be received within the retention slot to retain the door in the closed position, and wherein in the presence of the preset water condition the retention pin is configured to be withdrawn from the retention slot to release the door.

2. The scupper door system of claim 1, wherein the preset water condition comprises a minimum level of water at the interior side.

3. The scupper door system of claim 2, wherein the pivot comprises a pivot pin received within a pivot slot, wherein the pivot slot comprises a vertically extending portion, and wherein the pivot pin is translatable within the vertically extending portion to allow the door to vertically translate to a raised position.

4. The scupper door system of claim 3, wherein the door is buoyant and configured to vertically translate to the raised position when the minimum level of water is present at the interior side, and wherein the vertical translation of the door to the raised position withdraws the retention pin from the retention slot.

5. The scupper door system of claim 2, wherein the latch mechanism comprises a float operatively coupled to one of the retention pin and retention slot, and wherein the float is positioned to be raised by water present at the interior side such that the retention pin is withdrawn from the retention slot when the minimum level of water is present.

6. The scupper door system of claim 5, wherein the float is positioned within a chamber defined in the door, and wherein the chamber includes a fluid port dimensioned to allow water present at the interior side to enter the chamber and raise the float.

7. The scupper door system of claim 1, wherein the latch mechanism comprises a blocker plate attached to the frame and a float associated with the door having a blocking surface, wherein the float is positioned such that blocking surface extends below a height of and contacts the blocker plate when the door is in the closed position to prevent the door from pivoting to the open position in the absence of the preset water condition.

8. The scupper door system of claim 7, wherein the preset water condition comprises a minimum level of water at the interior side, and wherein the float is positioned to be floatable by the minimum level of water at the interior side to relocate the blocking surface above the blocker plate to release the door.

9. The scupper door system of claim 8, wherein the door defines a chamber in which the float is positioned.

10. The scupper door system of claim 9, wherein the door defines one or more fluid ports extending through a face of the door between the interior side and the chamber.

11. The scupper door system of claim 1, wherein the latch mechanism comprises a blocker plate attached to the frame and a fluid modifiable blocker, the fluid modifiable blocker positioned to contact the blocker plate to prevent the door from rotating from the closed position when so positioned, wherein the fluid modifiable blocker is positioned within a chamber accessible by water comprising the preset water condition at the interior side, wherein when the fluid modifiable blocker is accessed by the water the fluid modifiable blocker at least partially dissolves to release the door.

12. The scupper door system of claim 11, wherein the preset water condition comprises a minimum water level at the interior side.

13. The scupper door system of claim 12, further comprising a rain guard positioned to prevent falling rain from accessing the fluid modifiable material.

14. The scupper door system of claim 1, wherein the passageway comprises a first passageway and a second passageway defined by the frame, wherein the second passageway is stacked above the first passageway.

15. The scupper door system of claim 14, wherein the door comprises a first door and a second door, wherein the first door is positioned in the first passageway and the second door is positioned in the second passageway.

16. The scupper door system of claim 14, wherein the door is positioned in the second passageway and the first passageway is open.

17. A method of draining a roof, the method comprising:
locating a scupper frame within a parapet positioned on the roof, wherein the scupper frame defines a passageway between an interior side and an exterior side of the parapet, and wherein a door is positioned within the passageway at a pivot and rotatable between a closed position and an open position;
retaining the door in a closed position in the absence of a preset minimum level of water at the interior side;
opening the door to the open position in a first direction in response to a pressure exerted by the preset minimum level of water present at the interior side; and
preventing the door from opening to the open position in a second direction opposite of the first direction wherein the retaining the door in the closed position comprises extending a retention pin within a retention slot to retain the door in the closed position, and opening the door comprises using the pressure exerted by the preset minimum level of water to withdraw the retention pin from the retention slot.

18. The method of claim 17, wherein opening the door further comprises allowing the pressure exerted by the preset minimum level of water to rotate the door to the open position after the retention pin is withdrawn from the retention slot.

* * * * *